US008724146B2

(12) United States Patent
Miller et al.

(10) Patent No.: US 8,724,146 B2
(45) Date of Patent: May 13, 2014

(54) SYSTEMS AND METHODS FOR DEFINING PRINT SETTINGS USING DEVICE MOVEMENTS

(75) Inventors: Howard A. Miller, Saratoga, CA (US); David Gelphman, Aptos, CA (US); Richard Blanchard, Jr., Sonoma, CA (US)

(73) Assignee: Apple Inc., Cupertino, CA (US)

( * ) Notice: Subject to any disclaimer, the term of this patent is extended or adjusted under 35 U.S.C. 154(b) by 224 days.

(21) Appl. No.: 13/073,517

(22) Filed: Mar. 28, 2011

(65) Prior Publication Data

US 2012/0250071 A1  Oct. 4, 2012

(51) Int. Cl.
*G06F 3/12* (2006.01)
(52) U.S. Cl.
USPC ......................... 358/1.15; 358/1.13
(58) Field of Classification Search
None
See application file for complete search history.

(56) References Cited

U.S. PATENT DOCUMENTS

| 7,221,909 | B2 | 5/2007 | Kiyose |
| 7,595,904 | B2 | 9/2009 | Lapstun et al. |
| 7,701,602 | B2 | 4/2010 | Burke et al. |
| 7,705,830 | B2 | 4/2010 | Westerman et al. |
| 2004/0085573 | A1 | 5/2004 | Aidinejad |
| 2005/0111042 | A1 | 5/2005 | Ogiwara |
| 2005/0134891 | A1 | 6/2005 | Ishizaki |
| 2008/0021933 | A1 | 1/2008 | Ono |
| 2008/0100710 | A1* | 5/2008 | Masumoto et al. ........ 348/207.2 |
| 2009/0002771 | A1 | 1/2009 | Nguyen |
| 2009/0103124 | A1* | 4/2009 | Kimura et al. ............... 358/1.15 |
| 2009/0164894 | A1 | 6/2009 | Takekawa et al. |
| 2010/0141971 | A1 | 6/2010 | Yoshida et al. |
| 2010/0167646 | A1* | 7/2010 | Alameh et al. ............... 455/41.2 |
| 2011/0157636 | A1* | 6/2011 | Maeda ........................ 358/1.15 |

FOREIGN PATENT DOCUMENTS

WO     2009/072736     11/2009

OTHER PUBLICATIONS

Dulberg et al. "An Imprecise Mouse Gesture for the Fast Activation of Controls." Human-Computer Interaction—Interact '99, IFIP TC.13, pp. 1-10, 1999, http://www.cs.washington.edu/homes/lsz/papers/dsz-interact99.pdf, retrieved Nov. 17, 2010.
Worrall "Will Multi-Touch Technology Find Its Way in the Workplace?" http://blog.globalgraphics.com/gdoc/2010/01/will-multi-touch-technology-find-its-way-in-the-workplace/, retrieved Nov. 17, 2010, Posted Jan. 13, 2010.
HP ePrint manual, http://www.hp.com/hpinfo/newsroom/press_kits/2010/JustRightITopk/ePrint_Backgrounder.pdf, retrieved Nov. 17, 2010.

* cited by examiner

*Primary Examiner* — Benny Q Tieu
*Assistant Examiner* — Haris Sabah
(74) *Attorney, Agent, or Firm* — Van Court & Aldridge LLP

(57) ABSTRACT

This is directed to systems, methods, and computer-readable media for defining print settings. In some cases, particular motions of the device can be associated with print settings. In a print settings mode, when the electronic device detects a motion of the device, the device can identify a print setting associated with the detected motion. In some cases, a print setting can instead or in addition be defined in response to receiving an input from an input interface, wherein the input is independent from a displayed option. To print the content, the content and the defined print settings can be provided to a printer system.

20 Claims, 17 Drawing Sheets

SYSTEMS AND METHODS FOR DEFINING PRINT SETTINGS USING DEVICE MOVEMENTS

BACKGROUND OF THE INVENTION

An electronic device can be used to provide content, such as different types of documents, to a user. The content can be displayed on an electronic device display (e.g., a screen or projector). Using an input interface, the user can interact with displayed content to create, modify or edit, or revise the content, for example in combination with functions or features of applications providing the content. In some cases, however, a user may wish to print hard copy (e.g., on paper or another medium) of the content (e.g., to edit a printed text document using a writing instrument, or to share a hard copy of a photograph). To do so, the user can direct the electronic device to identify and select a printer (e.g., receive a user selection from a pull down menu). In some cases, the user can define settings defining a manner in which the content is printed. Defining and/or changing settings from a portable device, however, may prove to be difficult.

SUMMARY OF THE INVENTION

This is directed to systems, methods, and computer-readable media for defining print settings for content based on the amount and direction of movement of a device from which the content is printed. In addition, this is directed to systems, methods, and computer-readable media for defining print settings based on one or more inputs provided on a touch input interface, where the input(s) is at least initially independent from displayed print setting options.

Some electronic devices can include displays on which content is provided, and input interfaces for interacting with the content. In some devices, an input interface can, in part, be integrated within a display. For example, a device can include a touch screen provided on a display. When the size of the display is small, or when the content is large relative to the display, there may be insufficient space to display selectable print settings for defining the desired manner in which the content is to be printed. Alternatively, although a print settings overlay can be displayed, the options in the overlay may be small and difficult to select. An alternative approach for defining print settings may be advantageous.

In some embodiments, the motion of the electronic device can be used to define print settings. The electronic device can include one or more motion sensing components for detecting and identifying particular motions or movements of the device. For example, the electronic device can include an accelerometer and/or a gyroscope that provides signals related to the motion of the device. Particular motions of the device can be associated with print settings. In some cases, motion can be associated with a print settings mode, which must be enabled before the user can define print settings. When the electronic device is moved in a particular manner, the motion sensing component can provide an output describing the motion. The device can then compare the motion sensing component output, or the corresponding motion with a library of outputs or motions each associated with a print setting.

In response to identifying the particular print setting associated with a detected motion, the electronic device can define the identified print setting. When the content is provided to a printer system, the defined print setting can also be provided to specify the manner in which the content is printed.

In some cases, print settings can instead or in addition be defined using one or more inputs provided via an input interface. In particular, a touch interface of a device such as, for example, a touch screen, can be used to interact with the device. When a print settings mode of the device is enabled, the electronic device can monitor for particular touch gestures in regions of the device display. If a gesture in a region corresponds to a particular print setting, the electronic device can define the particular print setting.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

This is directed to systems, methods, and computer-readable media for defining print settings for content based on the amount and direction of movement of a device from which the content is printed. In addition, this is directed to systems, methods, and computer-readable media for defining print settings based on one or more inputs provided on a touch input interface, where the input(s) is independent from a displayed print setting option.

Figure 1:
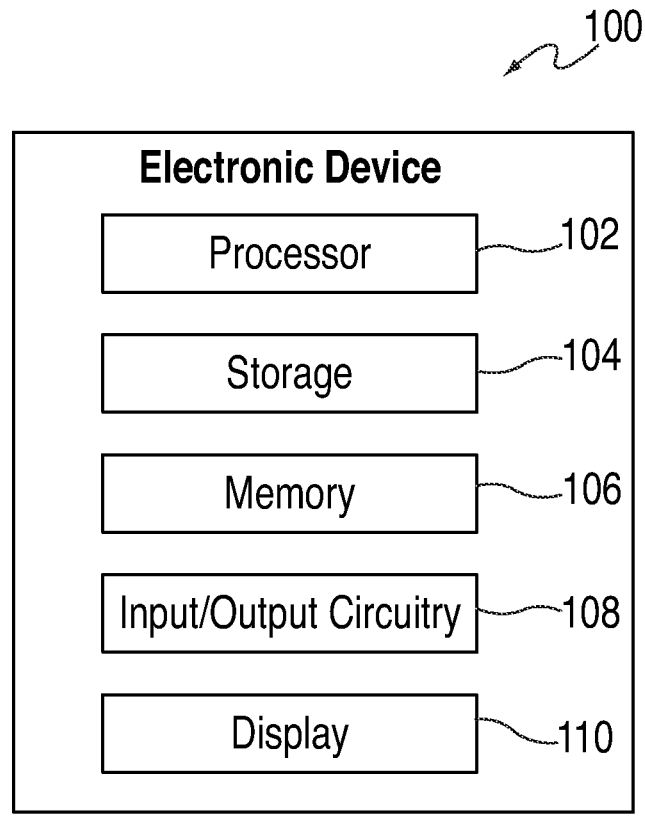
FIG. 1 is a schematic view of an illustrative electronic device for displaying content to be printed in accordance with some embodiments of the invention.

FIG. 1 is a schematic view of an illustrative electronic device for displaying content to be printed in accordance with some embodiments disclosed herein. Electronic device 100 can include any suitable type of electronic device operative to display information to a user. For example, electronic device 100 can include a media player such as an iPod® or an iPad® available by Apple Inc., of Cupertino, Calif., a cellular telephone, a personal e-mail or messaging, an iPhone® available from Apple Inc., pocket-sized personal computers, personal digital assistants (PDAs), a laptop computer, a music recorder, a video recorder, a gaming device, a camera, radios, medical equipment, and any other portable electronic device having a display from which a user can select information that can be printed out.

Electronic device 100 can include a processor or control circuitry 102, storage 104, memory 106, input/output circuitry 108, and display 110 as typically found in an electronic device of the type of electronic device 100, and can be operative to enable any of the uses expected from an electronic device of the type of electronic device 100 (e.g., connect to a host device for power or data transfers). In some embodiments, one or more of electronic device components 100 can be combined or omitted (e.g., storage 104 and memory 106 can be combined), electronic device 100 can include other components not combined or included in those shown in FIG. 1 (e.g., communications circuitry or positioning circuitry can be combined with one of the components shown in FIG. 1), or electronic device 100 can include several instances any of the components shown in FIG. 1. For the sake of simplicity, only one of each of the components is shown in FIG. 1.

Control circuitry 102 can include any processing circuitry or processor operative to control the operations and performance of electronic device 100. Storage 104 can include, for example, one or more storage mediums including a hard-drive, solid state drive, flash memory, permanent memory such as ROM, any other suitable type of storage component, or any combination thereof. Memory 106 can include cache memory, semi-permanent memory such as RAM, and/or one or more different types of memory used for temporarily storing data. In some embodiments, memory 106 and storage 104 can be combined as a single storage medium. Input/output circuitry 108 can be operative to convert (and encode/decode, if necessary) analog signals and other signals into digital data. Input/output circuitry 108 can be coupled to or include any suitable input interface, such as for example, a button, keypad, dial, a click wheel, a touch pad, or a touch screen, as well as any suitable output circuitry associated with output devices (e.g., audio outputs or display circuitry or components). In some embodiments, input/output circuitry 108 can enable a communications path between electronic device 100 and a printer system (e.g., a printer). The communications path can include, for example, a wired path (e.g., a USB cable) or a wireless path (e.g., a path provided by communications circuitry of the device and of the printer system).

Display 110 can be operatively coupled to control circuitry 102 for providing visual outputs to a user. Display 110 can include any suitable type of display including, for example, a liquid crystal display (LCD) (e.g., active matrix, passive matrix and the like), a monochrome display, color graphics adapter (CGA) display, enhanced graphics adapter (EGA) display, variable-graphics-array (VGA) display, super VGA display, cathode ray tube (CRT), a plasma display, a display implemented with electronic inks, or any other suitable display. Display 110 can be configured to display a graphical user interface that can provide an easy to use interface between a user of the computer system and the operating system or application running on the system.

In some embodiments, electronic device 100 can include a bus operative to provide a data transfer path for transferring data to, from, or between control processor 102, storage 104, memory 106, input/output circuitry 108, display 110 and any other component included in the electronic device.

Using electronic device 100, a user can generate, edit, revise or view content, for example as part of one or more documents. In some cases, a user can direct the electronic device to load an application for creating and editing a document, such as a word processing application, a spreadsheet application, or a photo capturing application. Using the application, the user can create or capture a new document. For example, the user can use an input interface to enter text or formulas for a text document or spreadsheet. As another example, the user can direct a camera or other sensor of the device to capture one or more frames. In some cases, the user can use the application to modify existing content. The electronic device can store generated, captured, or modified content as documents using storage of the device.

Figure 2:
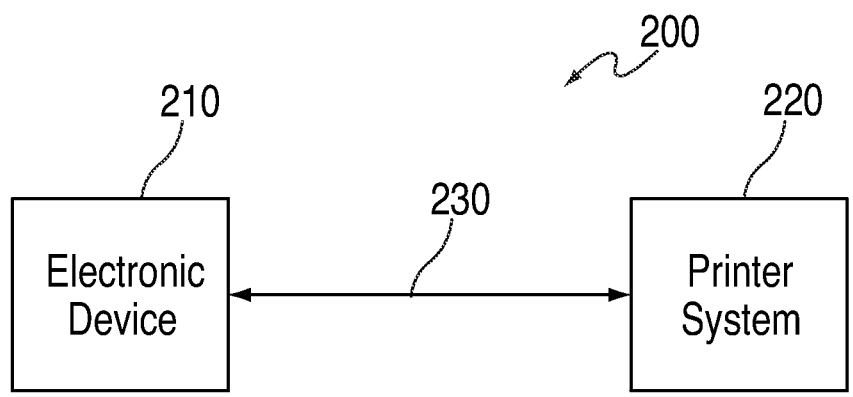
FIG. 2 is a schematic view of an illustrative device and printer system in accordance with some embodiments of the invention.

In some cases a user may wish to view a copy of the content outside of the electronic device. To do so, the user can direct the electronic device to print the content on a tangible medium, such as paper, using a printer system. FIG. 2 is a schematic view of an illustrative device and printer system in accordance with some embodiments of the invention. System 200 can include device 210 and printer system 220. Device 210 can include any suitable electronic device including, for example, an electronic device having some or all of the features of electronic device 100 (FIG. 1). Printer system 220 can include any suitable device or apparatus operative to construct a physical representation of an electronic document (e.g., electronic data) that the user can use outside of the electronic device. In particular, printer system 220 can include, for example, a laser printer, inkjet printer, thermal printer, dot matrix printer, plotter, facsimile machine, copying machine, or combinations of these. Printer system 220 can provide an output in one or more colors including, for example, a monochromic output or an output combining ink of several colors (e.g., cyan, magenta, yellow and black ink). The output can be provided on any suitable base or medium including, for example, paper of one or more colors, wood, plastic, metal, or any other surface on which ink or color can be overlaid. In some embodiments, the output of printer system 220 can be overlaid on previous outputs to form a three dimensional object (e.g., distinct ink layers of the printer form overlaid layers of a three dimensional object).

The electronic device can provide the information to print to the printer system using any suitable approach. In some embodiments, communications path 230 can be established between electronic device 210 and printer system 220. Communications path 230 can include any suitable wired or wireless communications path (or combinations of these), and can transfer data encoded using any suitable protocol. In some embodiments, communications path 230 can include circuitry for encoding, decoding, or modifying the information transmitted between the electronic device and the printer system.

Communications path 230 can connect to each of device 210 and printer system 220 using any suitable interface or connector. For example, communications path 230 can include a cable having connectors (e.g., USB connectors or Ethernet connectors) that connect to counterpart connector ports in each of the device and printer system. As another example, electronic device 210 and printer system 220 can include communications circuitry for connecting to a communications network supporting the communications path such as, for example, communications circuitry supporting Wi-Fi (e.g., a 802.11 protocol), Ethernet, Bluetooth™ (which is a trademark owned by Bluetooth Sig, Inc.), radio frequency systems, cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, FTP, RTP, RTSP, SSH, Voice over IP (VoIP), any other communications protocol, or any combination of these.

Figure 3:
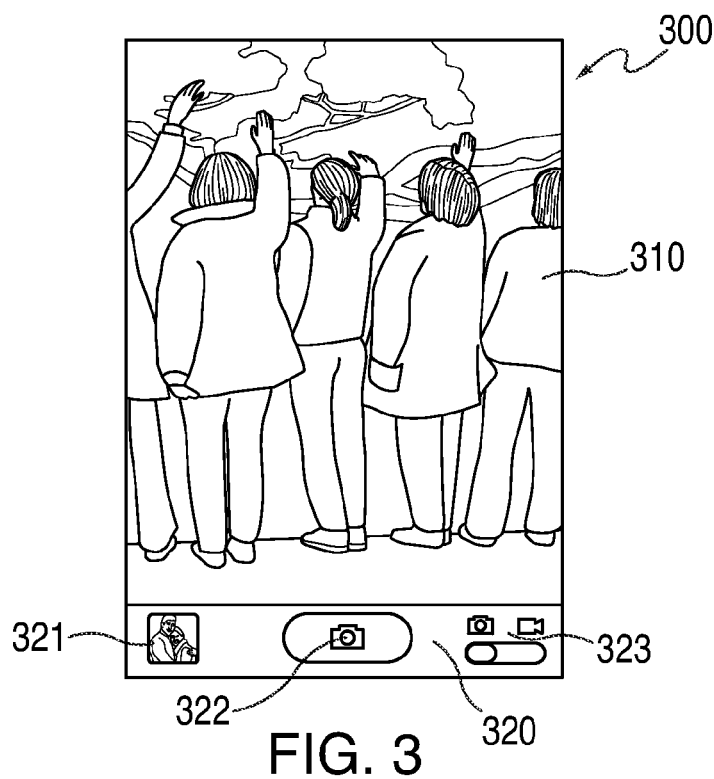
FIG. 3 is a schematic view of an illustrative electronic device display for displaying content in accordance with some embodiments of the invention.

A user can direct an electronic device to print a document using any suitable approach. In some embodiments, an application used to provide content can include a selectable print option or allow another input interface operation corresponding to providing a print instruction. FIG. 3 is a schematic view of an illustrative electronic device display for displaying content in accordance with some embodiments of the invention. In the example of FIG. 3, the content displayed is a photograph captured by the device, although it will be understood the features described in the context of the photograph can be applied to any suitable content, including content that may be printed over several pages. Display 300 can include image 310, for example, captured by a camera of the device using an image capture application. To control the operation of the image capture application, display 300 can include region 320 of options including, for example, photos option 321, capture option 322, and media type option 323.

Figure 4:
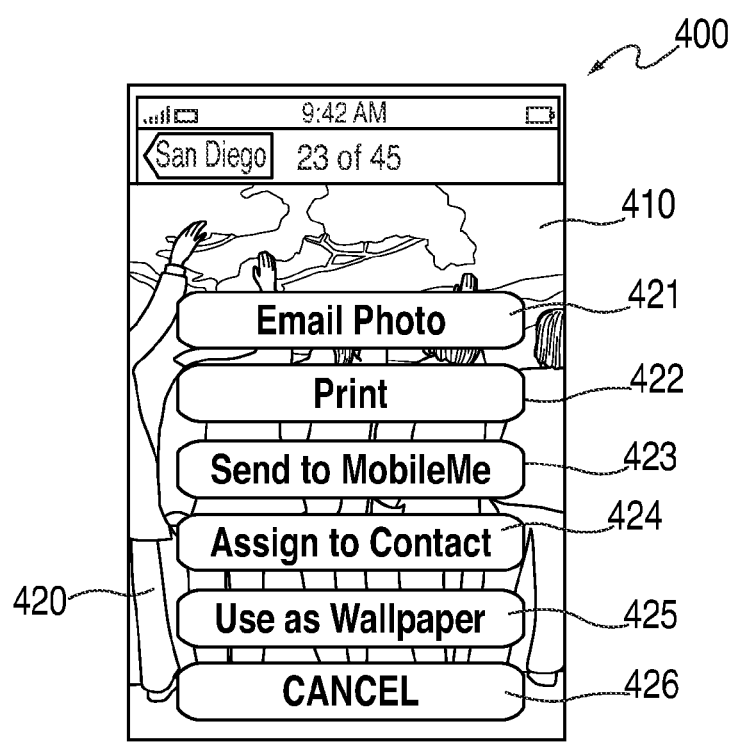
FIG. 4 is a schematic view of an illustrative display for printing content in accordance with some embodiments of the invention.

In some cases, a user may wish to print the displayed content (e.g., print the image). The user can then select a particular previously captured image (e.g., via photos option 321) and direct the device to display a menu providing available operations that the application can perform with the selected captured image. FIG. 4 is a schematic view of an illustrative display for printing content in accordance with some embodiments of the invention. Similar to FIG. 3, it will be understood the features described in the context of the image can be applied to any suitable content. Display 400 can include image 410 over which menu 420 of options for performing device operations can be provided. Menu 420 can be provided using any suitable approach including, for example, as a menu extending from a menu bar of the device (not shown). In some embodiments, menu 420 may not overlap with the display of image 410.

The electronic device can display any suitable option for performing an operation related to the displayed content. For example, menu 420 can include email option 421, print option 422, send to cloud option 423, contact option 424, and wallpaper option 425. In some embodiments, menu 420 can include cancel option 426 if a user decides not to perform any operation for which an option is provided. In addition, the options of menu 420 can include further sub-options or settings that a user can define, for example as part of selecting a menu option (e.g., a toggle option for selecting one of several printers). In some cases, however, the electronic device can provide sub-options in a new display in response to receiving a selection of a particular option of menu 420. In response to receiving a selection of print option 422, the electronic device can provide image 410 to a printer for printing.

Figure 5:
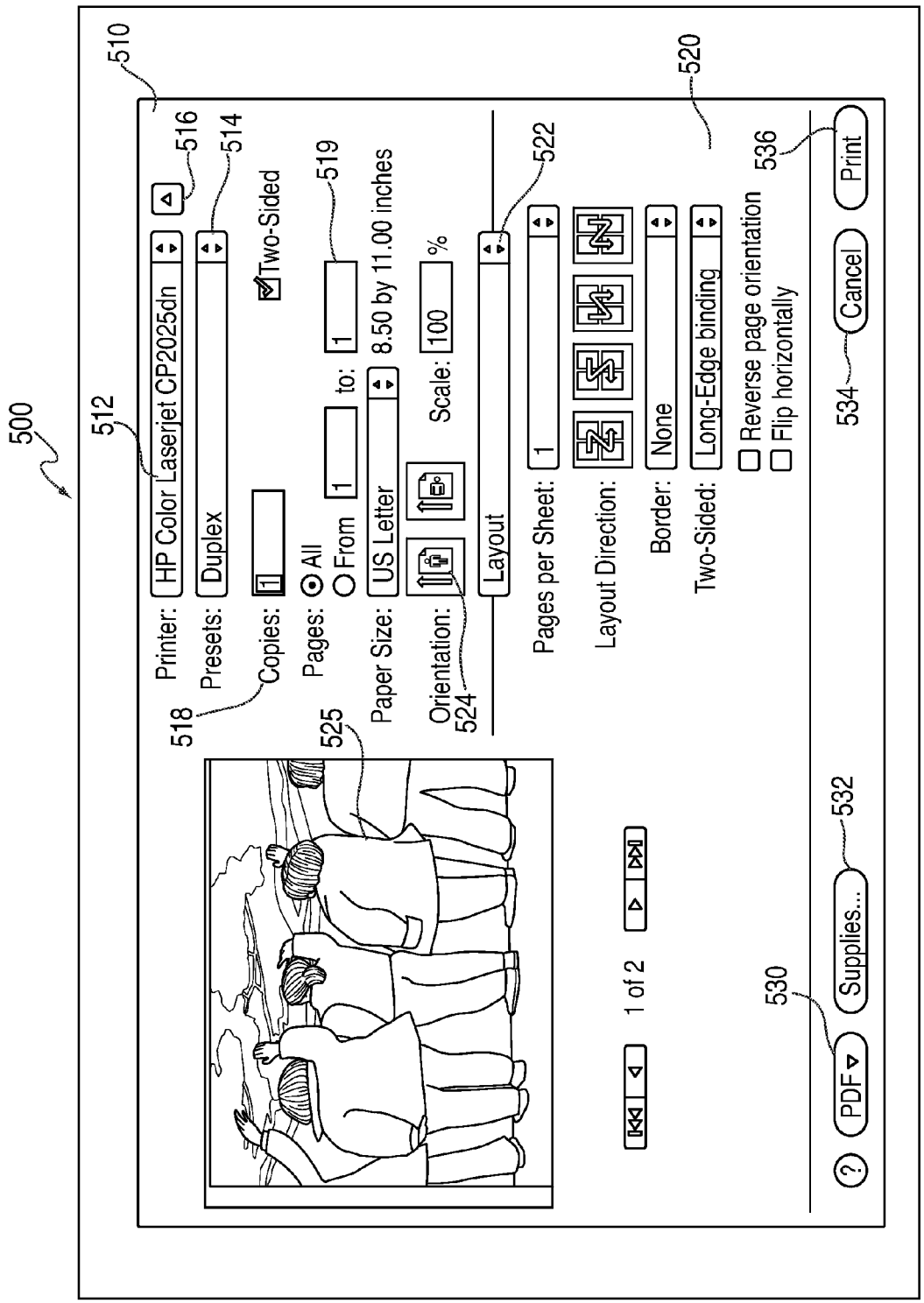
FIG. 5 is a schematic view of an illustrative display for defining print options using a menu in accordance with some embodiments of the invention.

In some embodiments, an electronic device can be used to define a multitude of settings as part of a printing process. For example, an electronic device can receive a user selection of options that define one or more of a printer to use, paper orientation, a selection pages to print, collation, two-sided printing, the document layout (pages per sheet or border), color matching, paper size, paper feed, the use of a cover page, stapling, margin shifts, or combinations of these. FIG. 5 is a schematic view of an illustrative display for defining print options using a menu. The electronic device can provide display 500 at any suitable time including, for example, in response to receiving an instruction to print a document (e.g., in response to receiving a selection of print option 422, FIG. 4). Display 500 can be provided in a device having a large display, or a keyboard and mouse or other input interface that allows a user to easily interact with the options of display 500. Display 500 can include printing options displayed using any suitable approach. For example, display 500 can include dialog or menu 510 having different options for defining a print request. In some cases, display 500 can instead or in addition provide the print options using other approaches including, for example, as a full display, as part of a menu, in an overlay, or combinations of these. Menu 510 can include any suitable option such as, for example, printer selection option 512, presets option 514, copies option 518, pages option 519, and option 516 for expanding the available options in region 520. In some embodiments, menu 510 can include print orientation option 524. Region 520 can include any suitable subset of options including, for example, options related to menu selection option 522. Menu selection 522 can be selected from a drop down menu defining several categories of printing sub-options. For example, the available options for menu selection 522 can include options for the printing layout, color handling, paper handling, paper feed, cover page, and scheduler. In response to selecting an option for menu selection 522, the electronic device can display sub-options related to the menu selection.

In the example of FIG. 5, region 520 can include sub-options related to the layout of a document to print. For example, region 520 can include preview option 525 (which may in some cases not be in region 520), a pages per sheet option, a border option, a two-sided option, and other options. The user can select one or more of the sub-options to define the manner in which a selected document is printed. In some embodiments, menu 510 can include option 530 for saving a document as a PDF, supplies option 532, cancel option 534 and print option 536.

In electronic devices having smaller displays or touch-based input interfaces, however, a user may have difficulty interacting with a complex user interface such as the one shown in FIG. 5. In particular, if the display is small, the entirety of menu 510 may not be provided on the display. Alternatively, the size of the text may be so reduced that a user may have difficulty reading or understanding the text. As still another alternative, the size of selectable options in menu 510 may be reduced to the point that selection becomes difficult.

Furthermore, expanding the options provided in menu 510 to be shown in several successive menus (e.g., that the user can cycle through) can be cumbersome for the user, especially if the user rarely changes print settings, or only wishes to change a setting on a last menu of the sequence of menus. It may be desirable, therefore, to provide an alternate approach for defining print settings using the input interface and the sensors of the device.

To define print settings after selecting particular content to print, a user can enable a print settings mode of the electronic device. In this manner, inputs provided on the input interface or by moving the device that, in a non-print settings mode, control other operations of the device, can be reconfigured to correspond to print settings. The user can enable the print settings mode using any suitable approach. In some cases, the electronic device can provide an instruction to enable the print settings mode using the input interface. For example, the electronic device can detect a selection of a displayed selectable option for enabling the print settings mode, for example displayed in the options of FIG. 4 (print settings option not shown in FIG. 4). In some cases, the electronic device can enable a print settings mode in response to detecting a particular movement of the electronic device. For example, the electronic device can detect a particular output from a motion sensing component (e.g., an accelerometer) that corresponds to a particular movement of the device. The movement can include, for example, shaking, flipping, rotating, spinning, moving laterally or to follow a shape, or combinations of these. In some cases, the electronic device can provide a description of the movement to the user of the device, for example in an overlay once the user has selected a print option.

Figure 6:
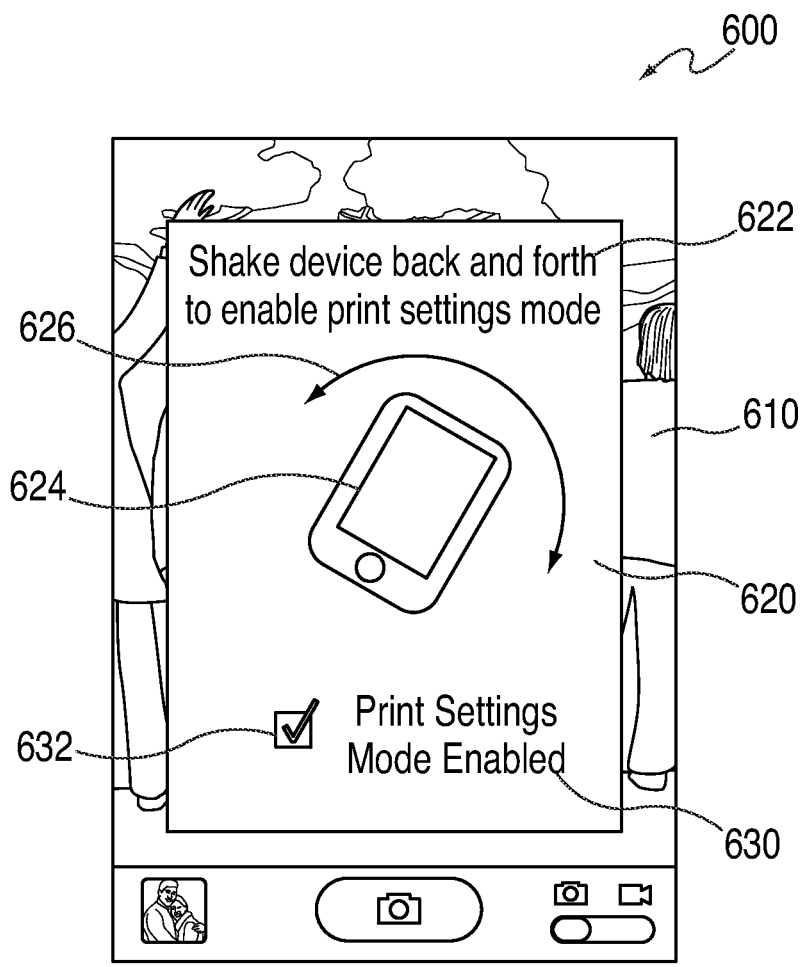
FIG. 6 shows an illustrative display for indicating that a print settings mode is enabled in accordance with some embodiments of the invention.

The electronic device can indicate that a print settings mode is enabled using any suitable approach. In some cases, the electronic device can provide an overlay indicating that the print settings mode is enabled. FIG. 6 shows an illustrative display for indicating that a print settings mode is enabled in accordance with some embodiments of the invention. Display 600 can include image 610, for example, a portion of a photograph or other image document. In response to receiving an instruction to print image 610, the electronic device can display menu 620 for allowing the user to enable a print settings mode. Although menu 620 is shown as an overlay in FIG. 6, it will be understood that menu 620 can be provided using any suitable approach.

Menu 620 can include instructions 622 indicating to a user how to move the device to enable the print settings mode. For example, instructions 622 can direct the user to shake the device. Menu 620 can include a diagram of device 622 with arrows 624 indicating how to move the device. When a motion sensor detects movement of the device that corresponds to movement associated with the print settings mode, the electronic device can enable the print settings mode. To indicate to the user that the mode has been enabled, menu 620 can toggle option 632 associated with label 630 corresponding to the mode.

The electronic device can remove menu 620 from display 600 at any suitable time. In some embodiments, menu 620 can be removed after a particular amount of time lapses. For example, menu 620 can be displayed during a range of 1 to 20 seconds (e.g., 5 seconds). If the electronic device does not detect an instruction to enable the print settings mode before the time lapses, the electronic device can print the content for which a print instruction was received using default print settings. Alternatively, once an instruction to enable the print settings mode has detected, menu 620 can be removed. In some cases, however, menu 620 can be temporarily displayed to confirm that the mode is enabled (e.g., display menu 620 with option 632 toggled for at least a determined length of time such as, for example, 2 seconds).

Once the print settings mode has been enabled, the electronic device can monitor for inputs corresponding to different types of print settings. In some embodiments, some print settings can be enabled by specific movements of the device. In particular, outputs of a motion sensing component of the device can be analyzed to determine whether the outputs correspond to specific movement associated with a print setting. In some cases, the output of several different motion sensing components (e.g., the output of a gyroscope and of an accelerometer) can be analyzed together to identify a particular device movement.

Figure 7A:
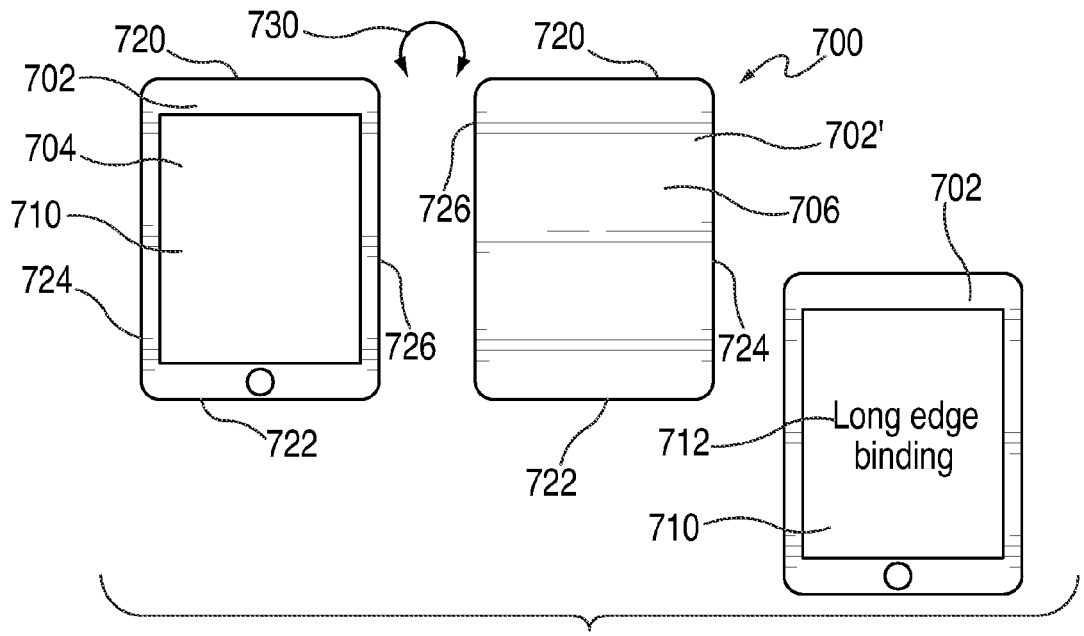
FIGS. 7A and 7B are schematic views of an illustrative device movement associated with a multi-page print setting in accordance with some embodiments of the invention.
Figure 7B:
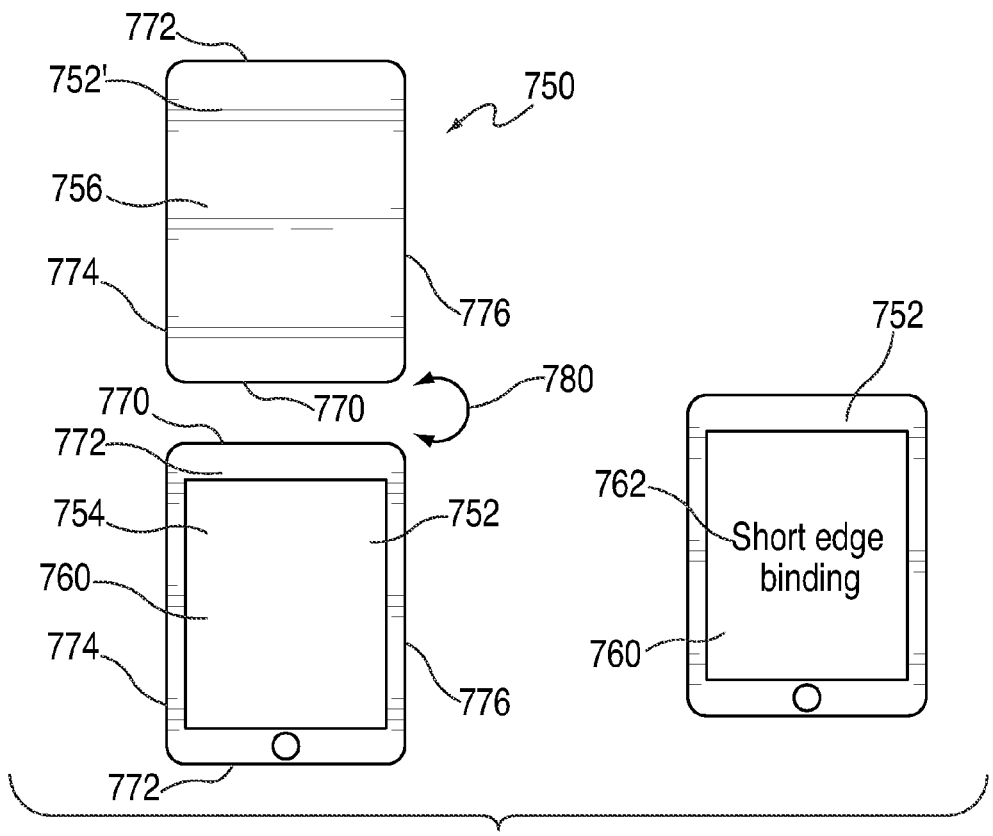

Different print settings can be associated with different types of device movements. FIGS. 7A and 7B are schematic views of an illustrative device movement associated with a multi-page print setting in accordance with some embodiments of the invention. Content provided on display 710 of electronic device 702 can, in some cases, be printed on both sides of a medium. For example, different pages of a document can be printed on front and back surfaces or sides of a piece of paper. The content can be oriented in different manners relative to the edges of the paper. For example, the content printed on each side of the paper can be oriented such that, if the content is bound along the short edge of the paper, the content is facing the same direction as a piece of paper is turned around the short edge (e.g., short-edge binding). Similarly, the content can be oriented such that, if the content is bound along the long edge of the paper, the content is facing the same direction as a piece of paper is turned around the long edge (e.g., long-edge binding).

In some embodiments, a user can flip the device around an edge corresponding to an edge of the paper around which the paper is to be bound. For example, as shown in FIG. 7A, device 702 can include front surface 704 having display 710, and back surface 706. Device 702 can include short upper edge 720 and short lower edge 722, and long left edge 724 and long right edge 726. The user can flip device 702 over left edge 724 or right edge 726 along arrow 730 (as shown by the position of device 702' relative to the position of device 702), for example, from the front surface to the back surface, from the back surface to the front surface, or from the front surface to the back surface and back to the front surface, all around the same edge or same axis, to perform long edge bound two-sided printing.

Similarly, the user can flip device 752, having display 760 on front surface 754, back surface 756, short upper edge 770, short lower edge 772, long left edge 774 and long right edge 776, over short top edge 770 or short bottom edge 772 to perform short edge bound two-sided printing (e.g., flip along line 780, as shown by the position of device 752').

When a user flips the electronic device, the device can monitor for the output of a motion sensing component corresponding to a flipping motion over an edge of the device. For example, the device can identify one of edges 720, 722, 724, and 726 over which the device is flipped. The identified edge can then serve as the edge providing an orientation for binding the printed paper, should the paper be bound. In some cases, electronic device 702 can provide information 712 in display 710 identifying the particular edge detected for double sided printing (e.g., "long edge binding"). Similarly, electronic device 752 can provide information 762 on display 760 (e.g., identifying "short edge binding").

In response to detecting the motion of the device and determining that an instruction to print the content double sided, the electronic device can define a print setting corresponding to two-sided printing with binding along the side corresponding to the motion. In some cases, the print setting can be incorporated in the encoding or glyphs transmitted to or used by the printer system to provide an output corresponding to the content.

Figure 8A:
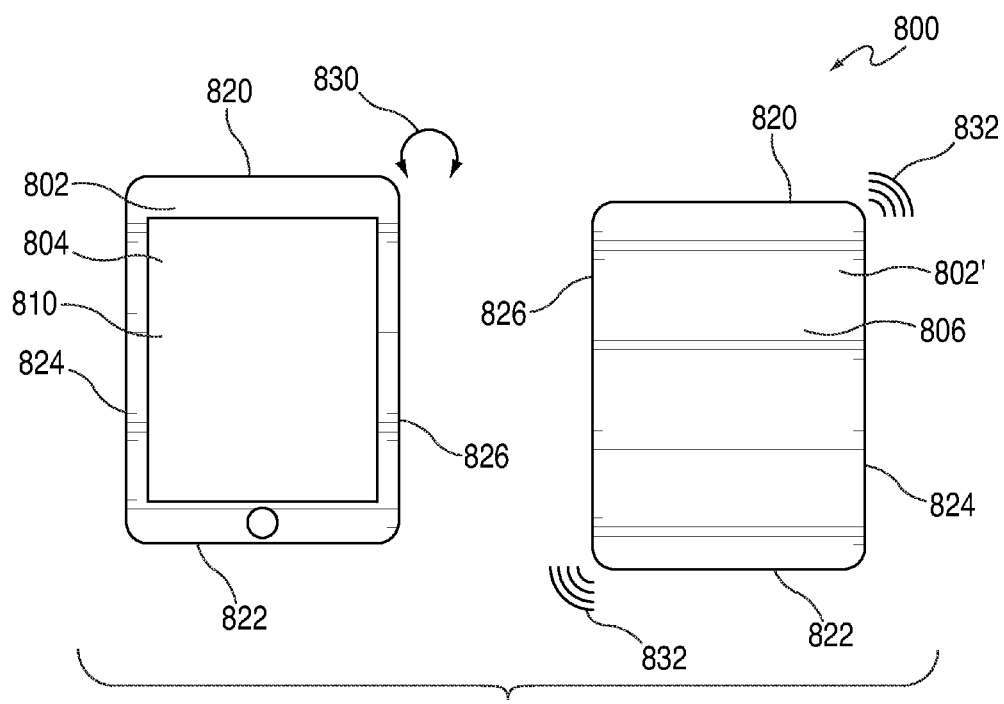
FIGS. 8A and 8B are schematic views showing how an illustrative device can be used to cancel a print setting in accordance with some embodiments of the invention.
Figure 8B:
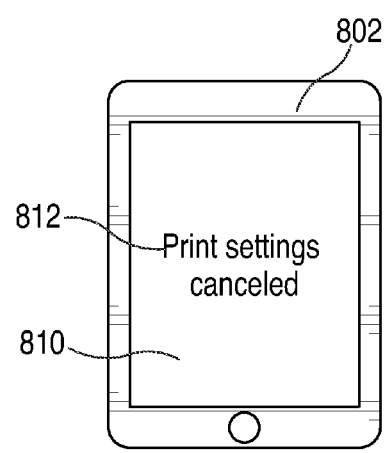

In some cases, a user can move the electronic device to cancel or undo a previously defined setting. FIGS. 8A and 8B are schematic views showing how an illustrative device can be used to cancel a print setting in accordance with some embodiments of the invention. Content can be provided on display 810 of electronic device 802. Device 802 can include front surface 804 having display 810, and back surface 806. Device 802 can include short upper edge 820 and short lower edge 822, and long left edge 824 and long right edge 826. The user can flip device 802 over one of edges 820, 822, 824, or 826 (e.g., along arrow 830, showing the resulting position of device 802' relative to the position of device 802) such that back surface 806 faces the user. Once flipped over, the user can shake device 802, as indicated by symbols 832, to cancel or undo a print setting.

By combining a shaking motion with a flipping motion, the electronic device can reduce incidents of accidental canceling. The electronic device can provide confirmation to a user that a print setting was canceled using by providing content 812 in display 810, as shown in FIG. 8B. Alternatively, content 812 can include a selectable option for confirming that an instruction to cancel or undo was to be provided. In some cases, electronic device 802 can instead or in addition provide an audio or haptic indication that a cancel instruction was received, as display 810 of the device may be facing away from the user while the user shakes device 802.

Figure 9:
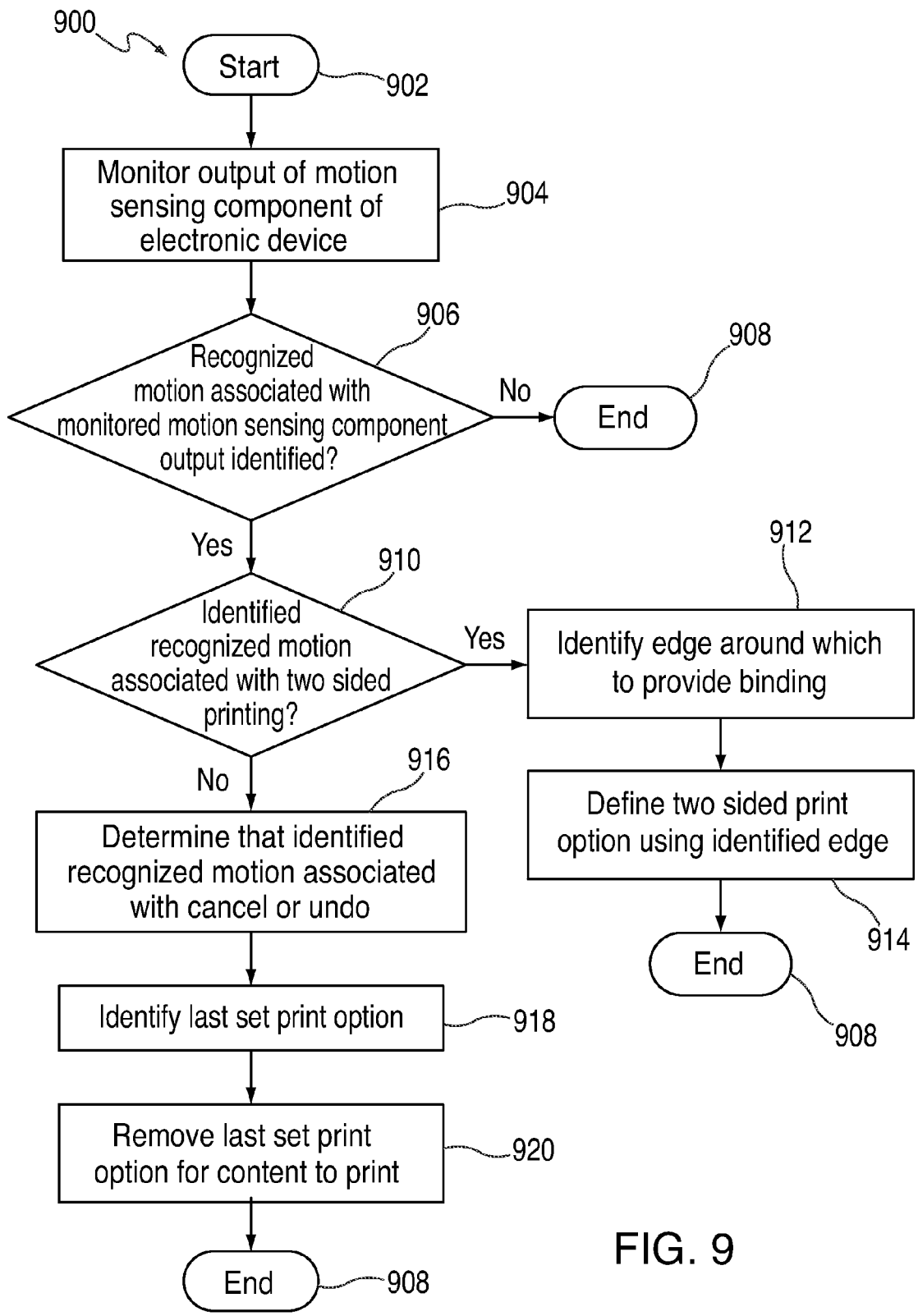
FIG. 9 is a flowchart of an illustrative process for defining print settings based on a device movement in accordance with some embodiments of the invention.

FIG. 9 is a flowchart of an illustrative process for defining print settings based on a device movement in accordance with some embodiments of the invention. Process 900 can begin at step 902. At step 904, an output of a motion sensing component of an electronic device that can be used to print content can be monitored. For example, the electronic device can monitor the output of an accelerometer or gyroscope describing the motion of the device. At step 906, the device can determine whether a recognized motion associated with the monitored motion sensing component output was identified. For example, the electronic device can compare the detected output with a library of outputs that are associated with different print settings. If the electronic device determines that no recognized motion is associated with the monitored motion sensing component output, process 900 can move to step 908 and end.

If, at step 906, the electronic device instead determines that a recognized motion is associated with the motion sensing component output, process 900 can move to step 910. At step 910, the device can determine whether the identified recognized motion is associated with two sided printing. For example, the electronic device can determine whether the output of the motion sensing component corresponds to a motion associated with two-sided printing (e.g., flipping the device over a side edge). If the device determines that the recognized motion is associated with two sided printing, process 900 can move to step 912. At step 912, the electronic device can identify an edge around which to provide binding. For example, the electronic device can identify the particular edge or type of edge (e.g., short or long) around which the device was flipped. At step 914, the electronic device can define a two sided print option using the identified edge. For example, the electronic device can provide content to a printer system, and transmit information corresponding to the two sided print option. Process 900 can then end at step 908.

If, at step 910, the electronic device instead determines that the recognized motion is not associated with two sided printing, process 900 can move to step 916. At step 916, the device can determine that the option is associated with a cancel or undo instruction. For example, the electronic device can determine that the motion includes flipping over the device, and shaking it. At step 918, the electronic device can identify the last set print option. For example, the electronic device can identify the last print option set by the user using an input interface, or by moving the device. At step 920, the electronic device removes the identified last set print option for the content to print. For example, the electronic device can not include the last print option when transmitting the content and options to a printer system. Process 900 can then end at step 908.

In some embodiments, once the print settings mode has been enabled, some specific print settings can be enabled by inputs provided using an input interface. For example, print settings can be enabled by providing an input using a touch interface. The input can, in some cases, at least initially be independent of print setting related options displayed by the device. Using the input interface, a user can define print settings for one or more of a border, a print area, a distribution of pages, stapling, hole punching, a paper type, or other print settings.

Figure 10:
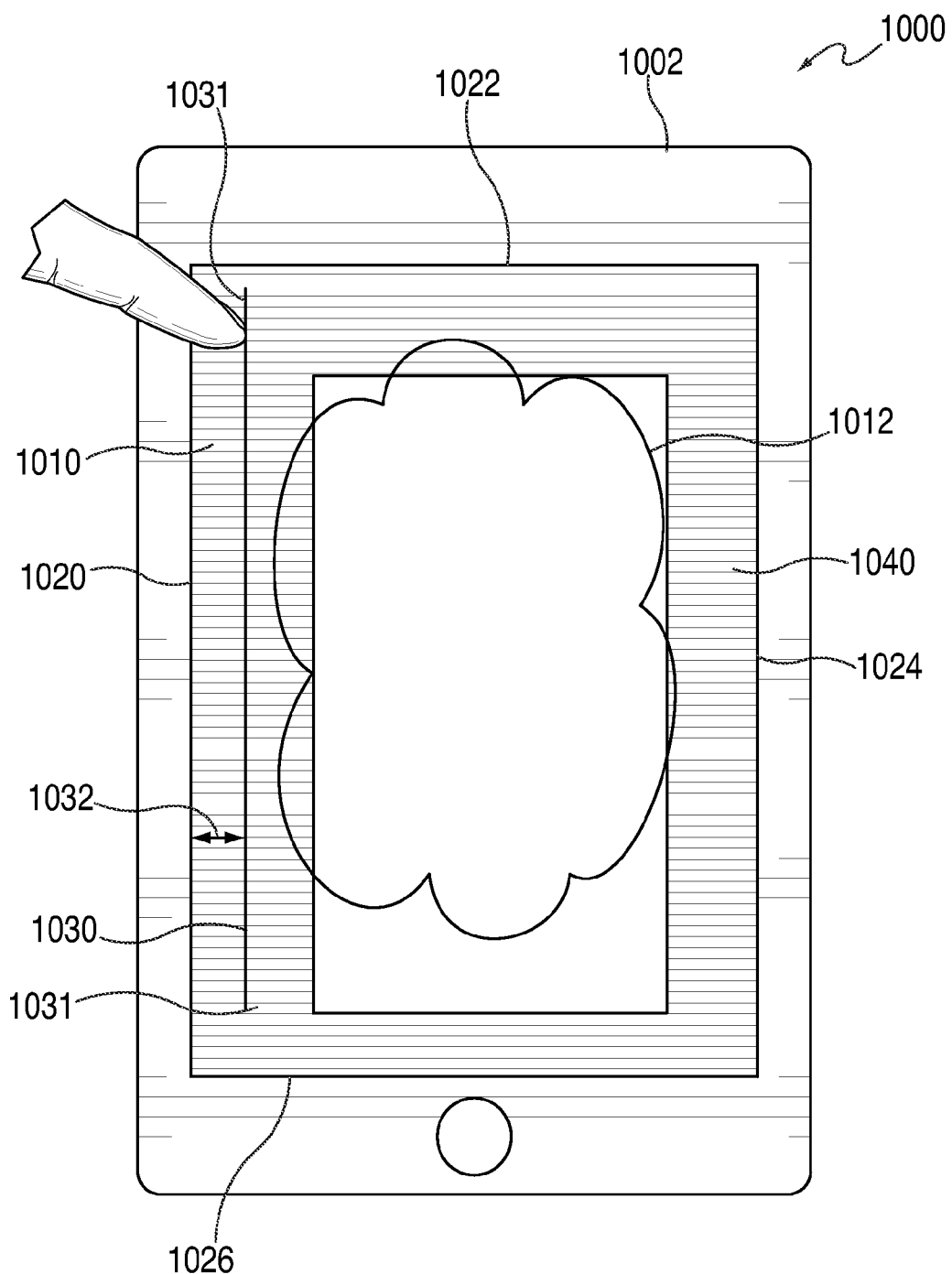
FIG. 10 is a schematic view of an illustrative device display that can be used to select a page border print setting in accordance with some embodiments of the invention.

FIG. 10 is a schematic view of an illustrative device display that can be used to select a page border print setting in accordance with some embodiments of the invention. Device 1000 can include display 1010 within housing 1002. Content 1012, which a user wishes to print, can be provided on display 1010. Display 1010 can include left boundary 1020, top boundary 1022, right boundary 1024, and bottom boundary 1026 defining edges for the displayed content. In some cases, a user may wish to print content 1012 such that a boundary is provided around at least one of the edges of content 1012.

A user can define a position for a boundary using different approaches. In some cases, a user can draw a line at a desired distance from one of boundaries 1020, 1022, 1024, and 1026 to define an edge for a border. For example, a user can draw line 1030 in an area of display 1010 that is adjacent to boundary 1020. Line 1030 can be substantially parallel to boundary 1020, and offset from the boundary by distance 1032. In some cases, the portions of display 1010 between boundary 1020 and line 1030 can be shaded, colored, or otherwise modified to virtually depict the border prior to actually printing the displayed content.

The user can change the size of the border by selecting and moving line 1030 on display 1010. For example, a user can touch line 1030, and drag the line toward or away from boundary 1020. In some cases, the user can change a height of a border by selecting one of ends 1031 of line 1030, and dragging a selected end toward or away from one of borders 1022 and 1026. As the position and size of line 1030 is changed, the depiction of the resulting border can be modified to provide an accurate preview to the user.

In some cases, the electronic device can define regions 1040 of a touch screen or a subset of inputs provided by an input interface to correspond with a border setting. For example, only inputs within a maximum distance from a boundary can be processed as instructions to define a border setting. Region 1040 of display 1010 that may receive inputs corresponding to a border setting can have any suitable size including, for example, a size determined from common border dimensions, most popular border types, or a maximum border size. In some cases, region 1040 can have different dimensions adjacent to different borders (e.g., a larger region near a top border than near a bottom border).

In some cases, only specific types of inputs provided in region 1040 can correspond to instructions to define a print setting. For example, only inputs that include a substantially straight line adjacent to a boundary of display 1010 can be processed as inputs corresponding to a border setting. The input can include a single straight line, or several line segments (e.g., four distinct connected segments defining a ring shape around display 1010). In some cases, the inputs may include lines that are substantially parallel to a nearest boundary (e.g., a vertical line near boundary 1020 or boundary 1024, or a horizontal line near boundary 1022 or boundary 1026).

The electronic device can draw a border around any suitable portion of display 1010 in response to detecting an initial line drawn by the user. In some cases, the border can be limited to a portion of display 1010 adjacent to the boundary closest to drawn line 1030. The user can then define different borders for each boundary by drawing independent lines adjacent to each boundary. In some cases, the electronic device can instead provide a border around some or all of display 1010 in response to detecting a line adjacent to one of the boundaries. The edge of the defined border can be at any suitable distance from each of the other boundaries including, for example, a same distance as distance 1032 between line 1030 and boundary 1020, or a distance related to distance 1032 (e.g., a proportional distance).

Figure 11:
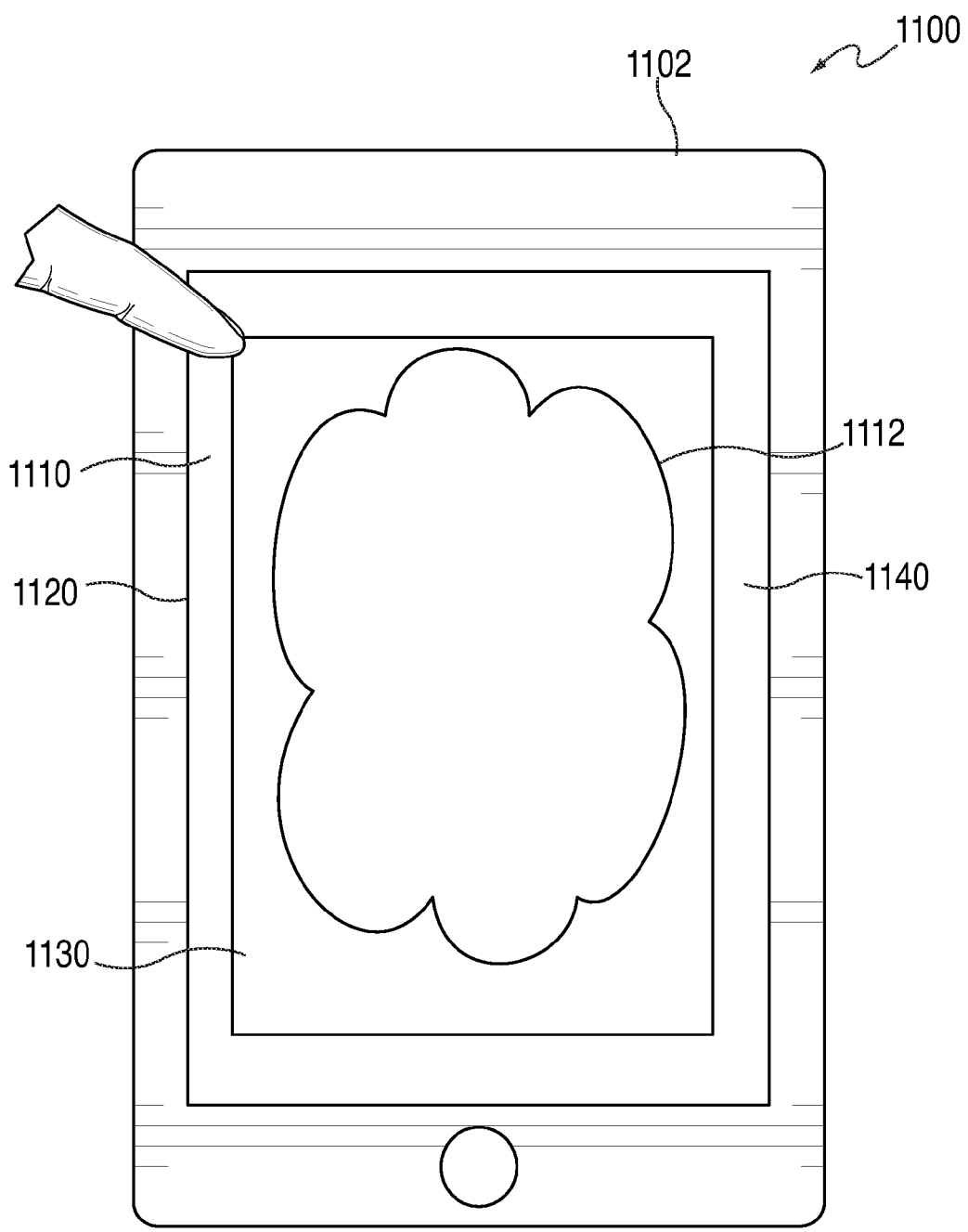
FIG. 11 is a schematic view of an illustrative device display that can be used to select a print area setting in accordance with some embodiments of the invention.

FIG. 11 is a schematic view of an illustrative device display that can be used to select a print area setting in accordance with some embodiments of the invention. Device 1100 can include display 1110 within housing 1102. Content 1112, which a user wishes to print, can be provided on display 1110. Display 1110 can include boundary 1120 extending around a periphery of the display. Content 1112 can include a single page of content, displayed partially or in its entirety on display 1110, or several pages of content of which a single page is provided on display 1110.

In some cases, a user may wish to print only a subset of content 1112 provided in display 1110. For example, the user may wish to select a portion of a page of a document, or a portion of an image to print. The selected portion can constitute the print area of the content.

A user can define the print area using different approaches. In some cases, a user can draw an initial print area 1130, for example by providing a touch input defining a closed path over content 1112 to define print area 1130 overlaid on display 1110. As the user provides the print gesture, the electronic device can determine that the user wishes to define a print area setting, and can overlay initial print area 1130 on display 1110. Alternatively, the user can provide a pinch gesture on an input interface to direct the device to provide a print area. When additional pinch gestures are provided, or when the initial pinch gesture continues after print area 1130 has been displayed, the size and shape of print area 1130 can change. In some cases, the user can select an edge of print area 1130 or a vertex of print area 1130, and drag the edge or vertex to change the dimensions, position, or both of print area 1130.

Print area 1130 can have any suitable size within display 1110. In some cases, the size of print area 1130 can be no larger than a maximum size corresponding to the dimensions of display 1110, or no more than the actual size of content 1112. In some cases, the size of print area 1130 can be no smaller than a minimum size corresponding to a reduced region of display 1110. In some cases, the minimum size can be determined from the size of display 1110, the size of the displayed content 1112 (e.g., based on the dimensions and resolution of an image), or combinations of these. For example, the minimum size can be selected to ensure that the printed content is readable or useable by a user.

Because a printer system may print using paper having pre-defined sizes, the dimensions or aspect ratio of print area 1130 can be constrained based on the dimensions or aspect ratio of paper sizes. For example, the aspect ratio of print area 1130 can correspond to the aspect ratio of letter-size or A4-size paper. As another example, print area 1130 can be defined to be equal to one of several standard sizes for photos (e.g., 3"×5" or 4"6"). As the user changes print area 1130, the aspect ratio of print area 1130 can remain constant, or print area 1130 can jump between preset dimensions corresponding to default paper sizes.

In some cases, instead of changing the dimensions and position of a print area 1130 overlay on display 1110, some or all of display 1110 can serve as the print area for content 1112. Using this approach, the particular portion of content 1112 visible on display 1110 can be printed by a printer system. To change the portion of content displayed, the user can provide a pinch input or other input to change the amount of content displayed, or to scroll or drag the content on display 1110 and change the particular portion of content 1112 shown in display 1110. Once the desired portion of content 1112 is shown in display 1110, the user can provide a print instruction.

Figure 12:
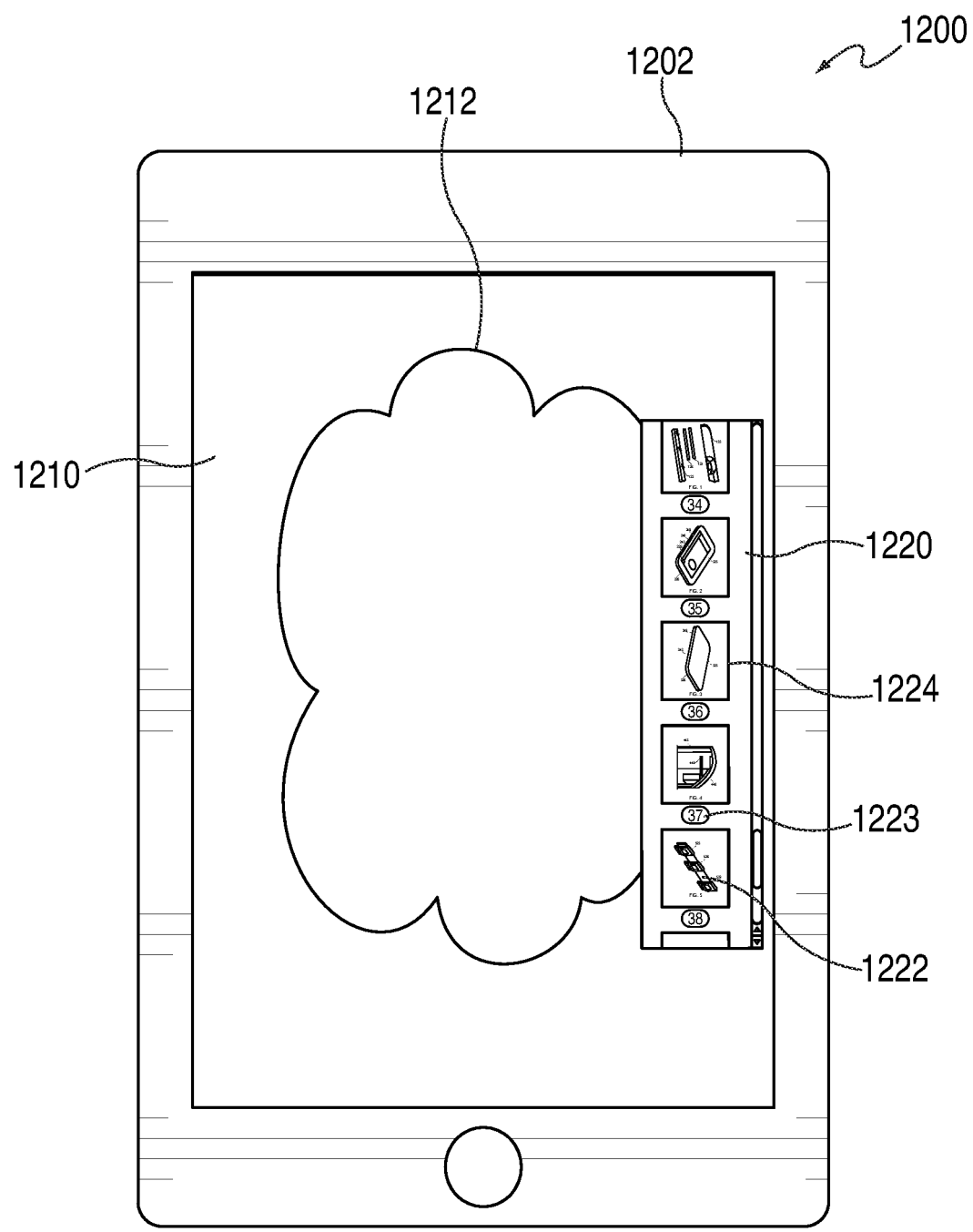
FIG. 12 is a schematic view of an illustrative device that can be used to select a page range of pages to print in accordance with some embodiments of the invention.

Some content that is displayed by an electronic device can be provided as several pages of a document. For example, a user can direct an electronic device to display a multi-page text document or presentation. When a user prints a multi-page document, the user may not wish to print every page, but may instead wish to print a specific range of pages of the document. FIG. 12 is a schematic view of an illustrative device that can be used to select a page range of pages to print in accordance with some embodiments of the invention. Device 1200 can include display 1210 within housing 1202. Content 1212, which a user wishes to print, can be provided on display 1210. Content 1212 can include a particular page of a several page document. For example, content 1212 can correspond to an image of an album, a page of text of a text document, a slide of a presentation, or any other such content. In some cases, content 1212 can include content from several pages (e.g., two pages of content in a column view, or parts of two consecutive pages).

In some cases, a user may wish to print only a subset of content 1212 provided in display 1210. For example, the user may wish to select only some of the pages of content 1212 to print. The user can provide any suitable input to provide a page range setting to the device. For example, the user can provide a pinching gesture using an input interface. In response to detecting an input corresponding to a page range setting, the electronic device can display pages overlay 1220 on display 1210. Overlay 1220 can be displayed on any suitable portion of display 1210. In some cases, overlay 1220 can be positioned adjacent to an edge of display 1210. For example, overlay 1220 can extend substantially horizontally and adjacent to a top or bottom edge of display 1210, or overlay 1220 can extend substantially vertically and adjacent to a left or right edge of display 1210 (e.g., as shown in FIG. 12).

Overlay 1220 can include representations 1222 of individual pages of the document. To select a particular page range to print, the user can select individual representations 1222 identifying pages to print, or not to print. For example, the device can identify selected representations 1222 using highlight region 1224. In some cases, the user can select several pages using a pinching input, or by touching a first representation and dragging a touch towards other representations.

In some cases, representations 1222 can be sized such that overlay 1220 includes a representation for each page of the document. When the document includes a large number of pages, however, the resulting representations may be so small that they may have limited use. In such cases, the representations can be scrolled within overlay 1220. To assist the user in identifying the pages corresponding to displayed representations 1222, page numbers 1223 can be displayed for each representation.

While a user may sometimes wish to print several pages of a document, at other times a user may wish to print several pages of a document on a single piece of paper. To do so, a user can enable a print distribution setting. FIGS. 13A-13D are schematic views of devices that can be used to select a print distribution setting in accordance with some embodiments of the invention. Device 1300 can include display 1310 within housing 1302 on which content can be provided. The content can include content from a document having several pages. For example, content 1312 can correspond to an image of an album, a page of text of a text document, a slide of a presentation, or any other such content that extends over several pages.

Figure 13A:
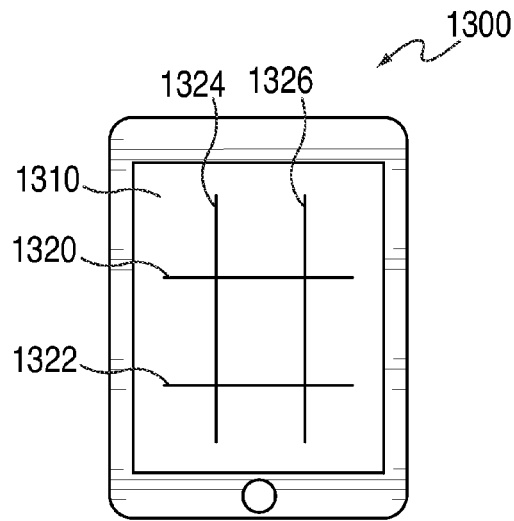
FIGS. 13A-13D are schematic views of devices that can be used to select a print distribution setting in accordance with some embodiments of the invention.

In some cases, a user may wish to print several pages of the document on a single piece of paper. To do so, the user can define a print distribution setting specifying the number of pages to place on each printed piece of paper. Any suitable input can correspond to the print distribution setting. For example, a user can provide an input to define the number of pages to place on the piece of paper. In particular, the user can define a grid on display 1310 that represents a particular number of pages. In the example of FIG. 13A, a user can draw parallel horizontal lines 1320 and 1322, and parallel vertical lines 1324 and 1326. The lines can intersect to create nine distinct regions, each corresponding to a different page. The user can draw any suitable pattern on display 1310 to define different pages. In addition, the position of each drawn line can define the distribution of pages in the printout. For example, one horizontal line and two vertical lines can be drawn to create two lines of three pages. As another example, two horizontal lines and one vertical line can be drawn to create three lines of two pages each.

Each region can have any suitable size. In some cases, each region can have the same size. For example, the electronic device can automatically resize each region so that they have the same dimensions. As another example, the electronic device can provide regions having different sizes based on the relative positions of the grid defined by the user. In this manner, the electronic device can print several pages on a single piece of paper such that a particular page is larger than others (e.g., a large page in a left column and two smaller pages in a right column).

Figure 13B:
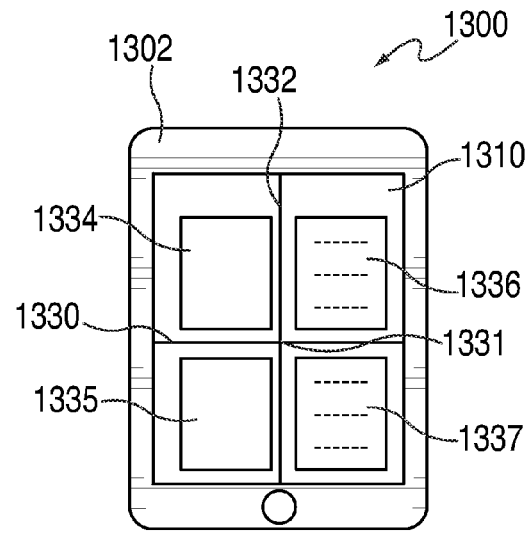
Figure 13C:
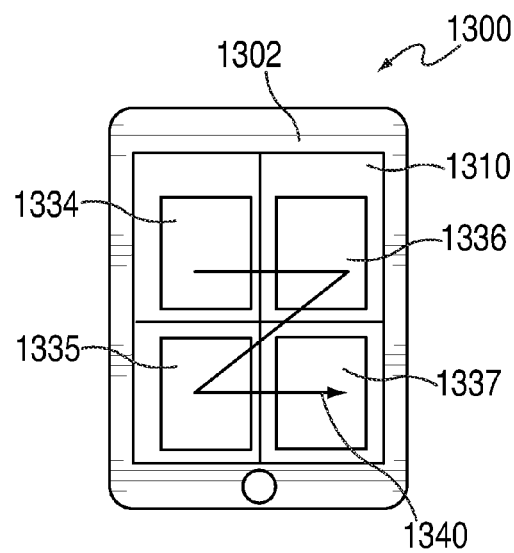
Figure 13D:
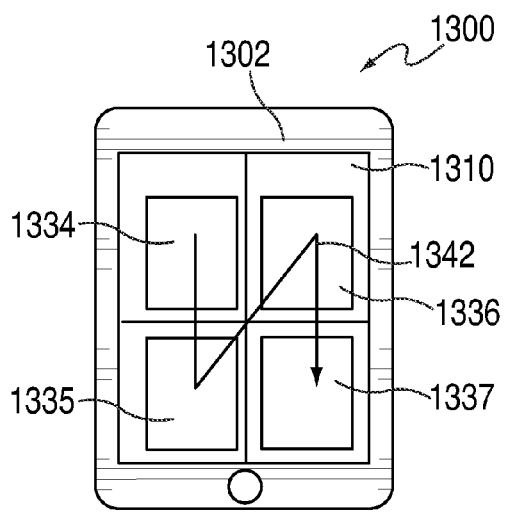

The electronic device can use different approaches to depict the relative size of each of the regions in which a page will be provided. In the example of FIG. 13B, a user has defined four distinct regions by drawing horizontal line 1330 and vertical line 1332. Each of regions 1334, 1335, 1336 and 1337 can extend from a corner of display 1310 towards point 1331 at the intersection of lines 1330 and 1332 (e.g., the center of the grid). In some cases, point 1331 may be concurrent with the center of display 1310.

The electronic device can provide a depiction of each of regions 1334, 1335, 1336, and 1337 to provide the user with an indication of the position and size of each region. If the user wishes for one or more additional regions, the user can define an additional line on display 1310 to redefine the regions. In some cases, a user can select a particular depiction of a region, and resize the depiction (e.g., using a dragging motion).

In some cases, a user may wish to print a page of a document followed by a region in which the user can take notes, as shown by lines in regions 1336 and 1337. In particular, if the document is a presentation, the user may want to print a region having lines on which the user can write next to some or all of the printed slides. The user can use different approaches to indicate that a particular region is to be left blank, or to indicate that lines are to be printed in the particular region. For example, the user can select a particular region, and provide an input corresponding to notes (e.g., scribbling on the display to imitate writing, or drawing horizontal lines).

Once the user has defined the number and position of regions in which pages are to be printed, the user can define the order in which pages are to be provided in each region. In particular, four consecutive pages of the document selected for printing can be provided in regions 1334, 1336, 1335, and 1337, respectively (e.g., left to right), or in regions 1334, 1335, 1336, and 1337, respectively (e.g., top to bottom). To indicate the particular order to use for the regions, the user can provide an input defining the order. For example, the user can provide an input following path 1340, shown in FIG. 13C, indicating that pages are to be provided in successively in regions 1334, 1336, 1335, and 1337. As another example, the user can provide an input following path 1342, shown in FIG. 13D, indicating that pages are to be provided in successively in regions 1334, 1335, 1336, and 1337. It will be understood, however, that the user can define any suitable order in which to provide pages in the regions defined on display 1310.

Figure 14:
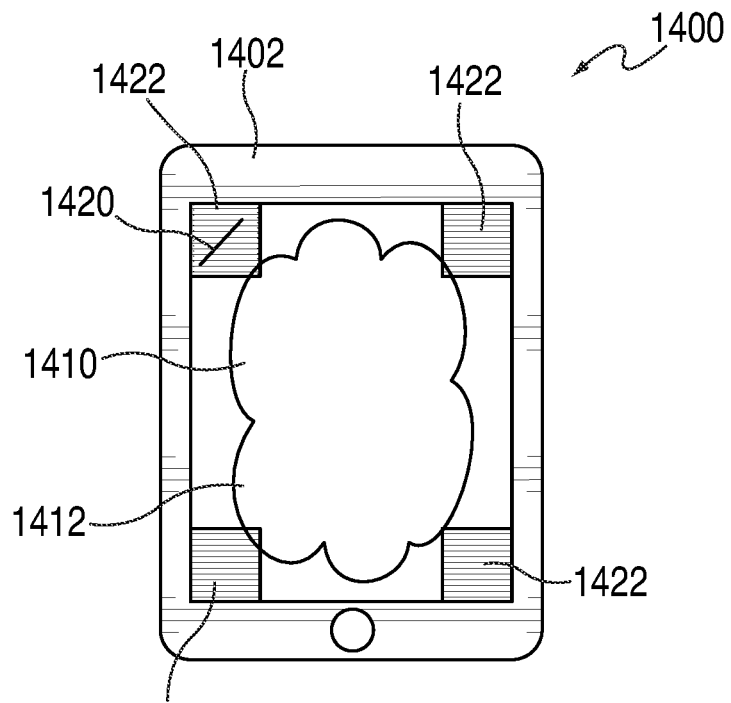
FIG. 14 is a schematic view of an illustrative device for stapling together several pages of a printed document in accordance with some embodiments of the invention.

When several pages are printed, the user may wish to couple the pages together for storage or for ease of use. For example, a user may wish to staple several pages together. As another example, a user may wish to place several pages together in a binder. FIG. 14 is a schematic view of an illustrative device for stapling together several pages of a printed document in accordance with some embodiments of the invention. Device 1400 can include display 1410 within housing 1402 on which content can be provided. The content can include content from a document having several pages. For example, content 1412 can correspond to an image of an album, a page of text of a text document, a slide of a presentation, or any other such content that extends over several pages.

In some cases, a user may wish to print several pages of the document. To prevent pages from being lost, or to prevent pages from being disordered, the printer system can staple together the pages of a printed document. Any suitable input provided to an input interface can correspond to an instruction to staple printed pages. In some embodiments, a user can provide an input in a region of display 1410 that corresponds to a typical position of a staple. For example, a user can provide an input in a region adjacent to a corner of display 1410 (e.g., provide a touch input in a region 1422 near a corner of display 1410). In response to detecting an input near a corner of display 1410, electronic device 1400 can display staple representation 1420 in the corresponding corner.

In some cases, a user may instead or in addition wish to place several pages of a printed document in a binder. To do so, the printer system may need to punch holes at appropriate positions on each printed page. Alternatively, the printer system may need to select paper having appropriate pre-punched holes.

Figure 15:
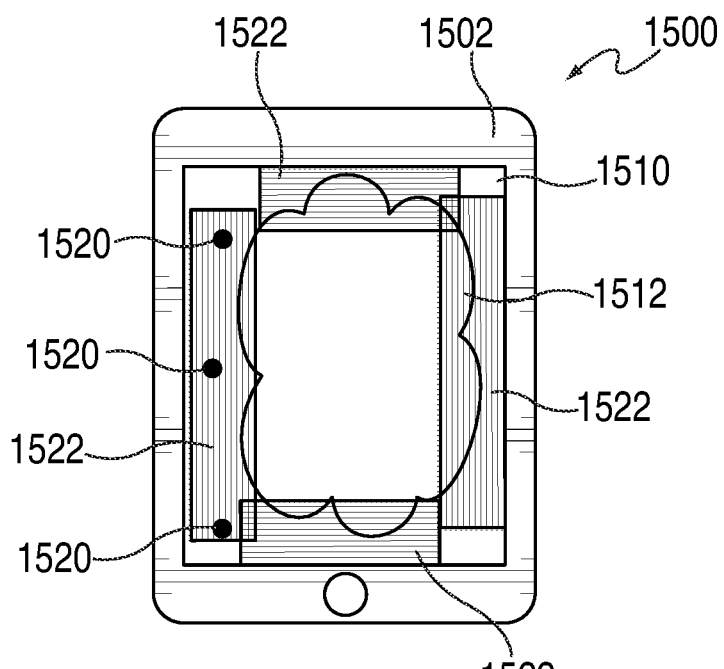
FIG. 15 is a schematic view of utilizing an electronic device to define which side holes should be on a print out in accordance with some embodiments of the invention.

FIG. 15 is a schematic view of utilizing an electronic device that can be used to select which side holes should be on a print out in accordance with some embodiments of the invention. Device 1500 can include display 1510 within housing 1502 on which content can be provided. The content can include content from a document having several pages. For example, content 1512 can correspond to an image of an album, a page of text of a text document, a slide of a presentation, or any other such content that extends over several pages.

As discussed above, a user may wish to provide holes in several printed pages to store the pages in a binder. The user can provide any suitable input to define a paper hole setting. In some cases, the user can provide a touch input on a region of display 1510 adjacent to which the user wishes to have the holes provided. For example, the user can successively or simultaneously provide inputs that identify a region of the paper at which to provide the holes (e.g., successively tap the left edge of display 1510 three times in three different positions, or simultaneously touch three portions of the display using three fingers). In the example of FIG. 15, the user has provided inputs to identify three holes 1520 along a left edge of the paper.

The input corresponding to the paper hole settings can be different from the type of input used to define other print settings. In particular, the input can include a tap or simple touch, as opposed to a pinching gesture, or a gesture for drawing a line, described above. To further differentiate inputs, the electronic device can define specific regions of display 1510 in which inputs corresponding to a paper hole setting can be provided. In particular, paper holes are typically provided near an edge of the paper. Accordingly, device 1500 can define regions 1522 along each edge of the device in which inputs corresponding to a paper hole setting can be detected. If inputs are received outside of regions 1522, the electronic device may determine that the inputs are unrelated to a paper hole setting.

Each of regions 1522 can have any suitable size. In some cases, the size of each region can be selected in part based on the largest distance from the edge at which holes are provided, the diameter of holes, the expected position and distribution of holes along an edge, or combinations of these. The regions 1522 can each be distinct regions along an edge of display 1510, or a single region defining a loop around the periphery of display 1510. In some cases, there may be no region 1522 adjacent to some edges of display 1510. For example, device 1500 can define regions 1522 only adjacent to left and top edge of display 1510.

As described above, the electronic device can identify display holes 1520 on display 1510 to indicate where the user wishes to have holes made. In some cases, however, there may be default or expected positions for holes, for example corresponding to the placement of a ring within a binder. To ensure that a printed paper will be properly received, the electronic device can adjust the position of holes 1520 from the specific position identified by a user to a position corresponding to a standard. For example, when the user provides an instruction to create three holes, the electronic device can re-position the middle hole at the center of the paper, and the top and bottom holes at equal distances from the middle hole. As another example, when the user provides an instruction to create two holes, the electronic device can reposition the two holes such that they are symmetrically disposed on the paper.

The particular distance between two or more holes can be selected using any suitable approach. In some cases, the electronic device can first determine the number of holes desired by the user, and then display hole templates corresponding to different standard hole positions for the determined number of holes. For example, if the device determines that two holes are to be provided, the device can provide templates in which the holes are 70 mm apart or 80 mm apart. In some cases, the electronic device can automatically select one of the templates based on, for example, the position of the user's inputs, the geographic region of the user, previously selected templates, or combinations of these.

Figure 16A:
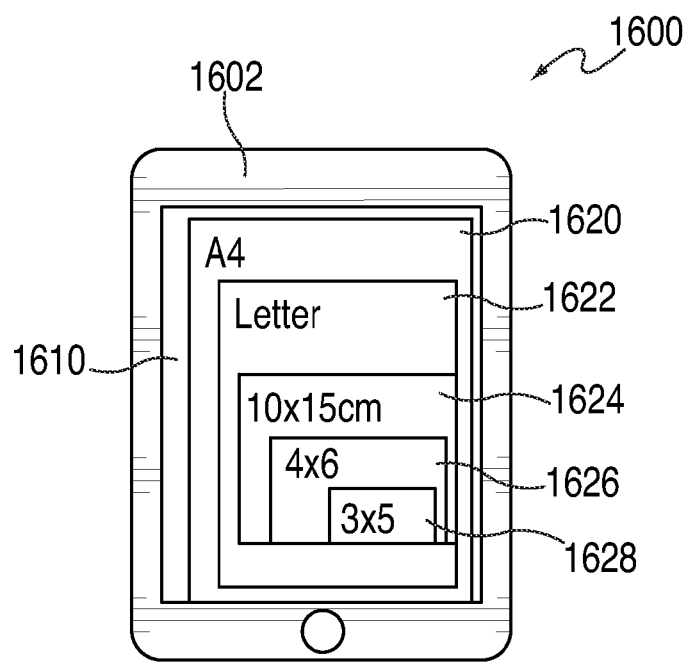
FIGS. 16A and 16B are schematic views of utilizing a device for selecting a paper size in accordance with some embodiments of the invention.
Figure 16B:
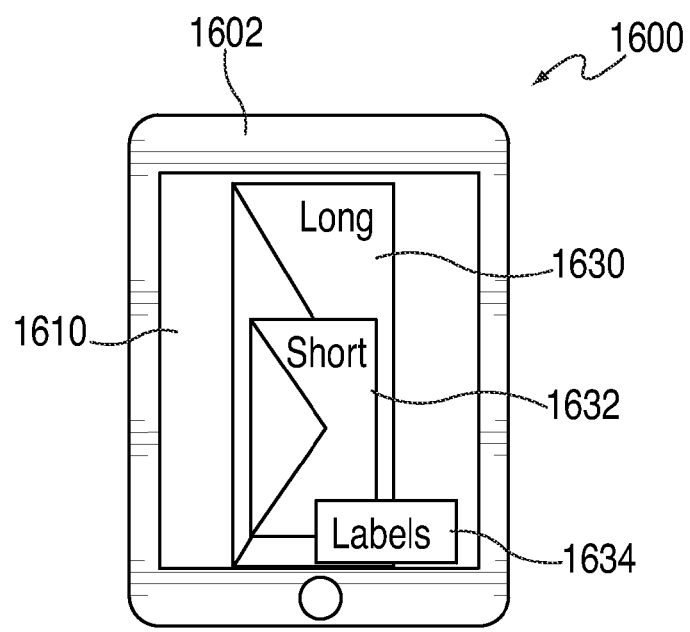

Different types of content can be optimally printed on different types of substrates (e.g., flat or glossy paper, labels, or envelopes). Different approaches can be used to ensure that the proper type of paper is used to print content. In some cases, the user can select a paper size using inputs provided to the device. FIGS. 16A and 16B are schematic views of utilizing a device for selecting a paper size in accordance with some embodiments of the invention. Device 1600 can include display 1610 within housing 1602 on which content can be provided. In some cases, a user may wish to select the paper on which content is to be printed. To do so, the user can define a paper selection setting specifying the type of paper to use. Any suitable input can correspond to the print distribution setting. For example, a user can provide an input depicting a particular paper size or type of paper (e.g., draw a small or large rectangle). As another example, the user can provide a particular gesture associated with a paper selection setting. In response to receiving the instruction to define a paper selection setting, device 1600 can display available paper templates from which the user can select.

Any suitable number of templates can be displayed by device 1600. In the example of FIG. 16A, display 1610 can include A4 template 1620, letter template 1622, 10×15 cm template 1624, 4×6 template 1626, and 3×5 template 1628. It will be understood however, that any combination of templates can be displayed by the device. To select a particular paper size, the user can provide an input selecting a displayed template.

The particular templates displayed by the device can be selected using any suitable criteria. In some cases, all known templates can be provided. Alternatively, templates corresponding to the geographic location of the device, or of the printer system can be used. In some cases, the electronic device can select templates based on the types of paper available to a printer system. For example, the electronic device can retrieve the types of paper available to a selected printer system, and display templates only for those retrieved types of paper. As another example, the electronic device can identify the types of paper available to all of the printer systems available to the device (e.g., the types of paper available to each of a set of networked printers to which the device can connect). If the user selects a particular paper size and printer system that does not have the selected paper size, the device can either prompt the user to select a paper size available to the selected printer system, or a printer system having the available paper size.

In some cases, the templates provided can be selected based on the particular content being printed. For example, if the content includes an address, the electronic device can automatically provide address-related templates. In the example of FIG. 16B, the templates can include large envelope template 1630, small envelope template 1632, and label template 1634. The user can then select one of the displayed templates to print the content on an appropriate paper. If the user wishes to print the content on a different type of paper, the user can direct the device to display alternate templates.

It will be understood that the print settings, and the approaches for defining or selecting them described above are merely illustrative, and that other print settings, or other manners of interacting with the device can be used to define or select the print settings. For example, movement of the device, or a particular input provided on an input interface can be used to direct the printer system to print content in color or in black and white.

Once the user has defined or selected the desired print settings, the user can exit the print settings mode and provide the content, along with the defined or selected print settings, to a printer system. The user can exit the print settings mode using any suitable approach. In some cases, the user can use a same gesture that was used to enable the print settings mode (e.g., the shaking gesture depicted in FIG. 6). Alternatively, the electronic device can determine a time period for the print settings mode, such that the electronic device exits the print settings mode after a particular duration lapses. The duration can begin at any suitable time including, for example, when the device initially enters the print settings mode (e.g., with a 30 second or a 1 minute countdown), after a last setting was selected (e.g., with a 5 second or 10 second countdown), or combinations of these. In some cases, the electronic device can exit the print settings mode and print content based on the proximity of the device with a printer system (e.g., when the device is in the range of a NFC or RF communications network associated with the printer system).

Figure 17:
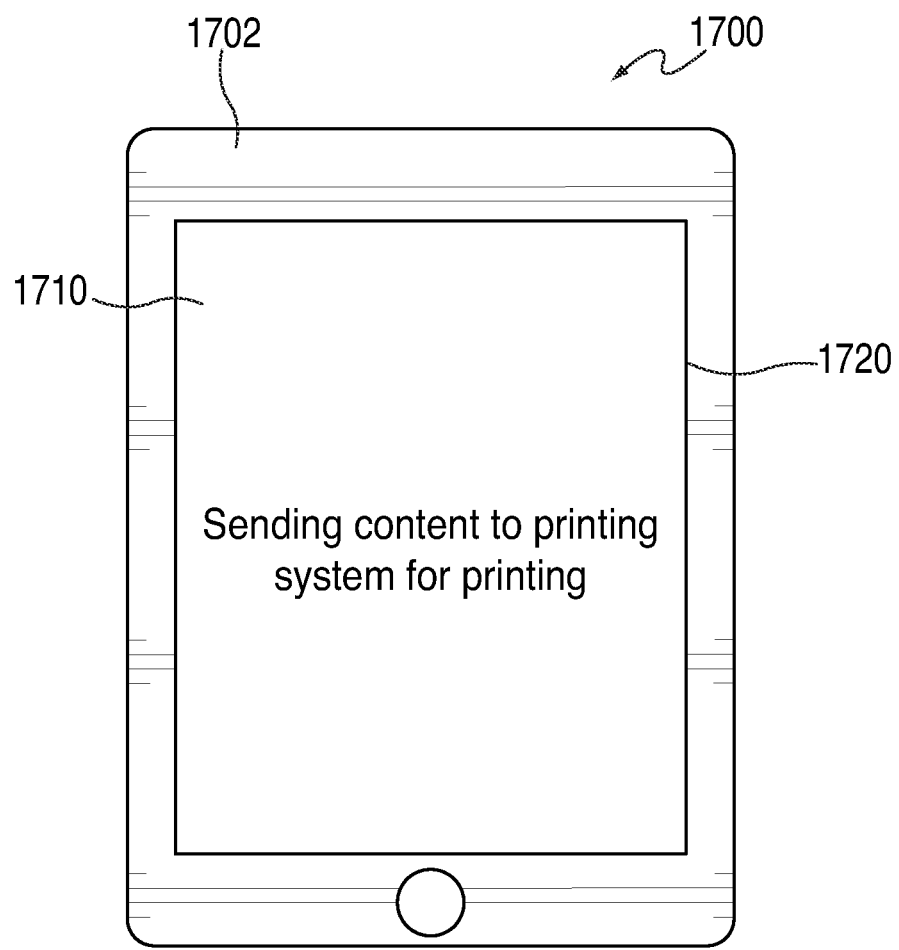
FIG. 17 is a schematic view of an electronic device in which print settings have been defined in accordance with some embodiments of the invention.

The electronic device can indicate to the user that the device has exited the print settings mode using any suitable approach. FIG. 17 is a schematic view of an electronic device in which print settings have been selected in accordance with some embodiments of the invention. Electronic device 1700 can include display 1710 providing information to a user. In response to determining that the user has instructed the device to exit the print settings mode, device 1700 can display message 1720 indicating that the content is being sent to a printer system.

Figure 18:
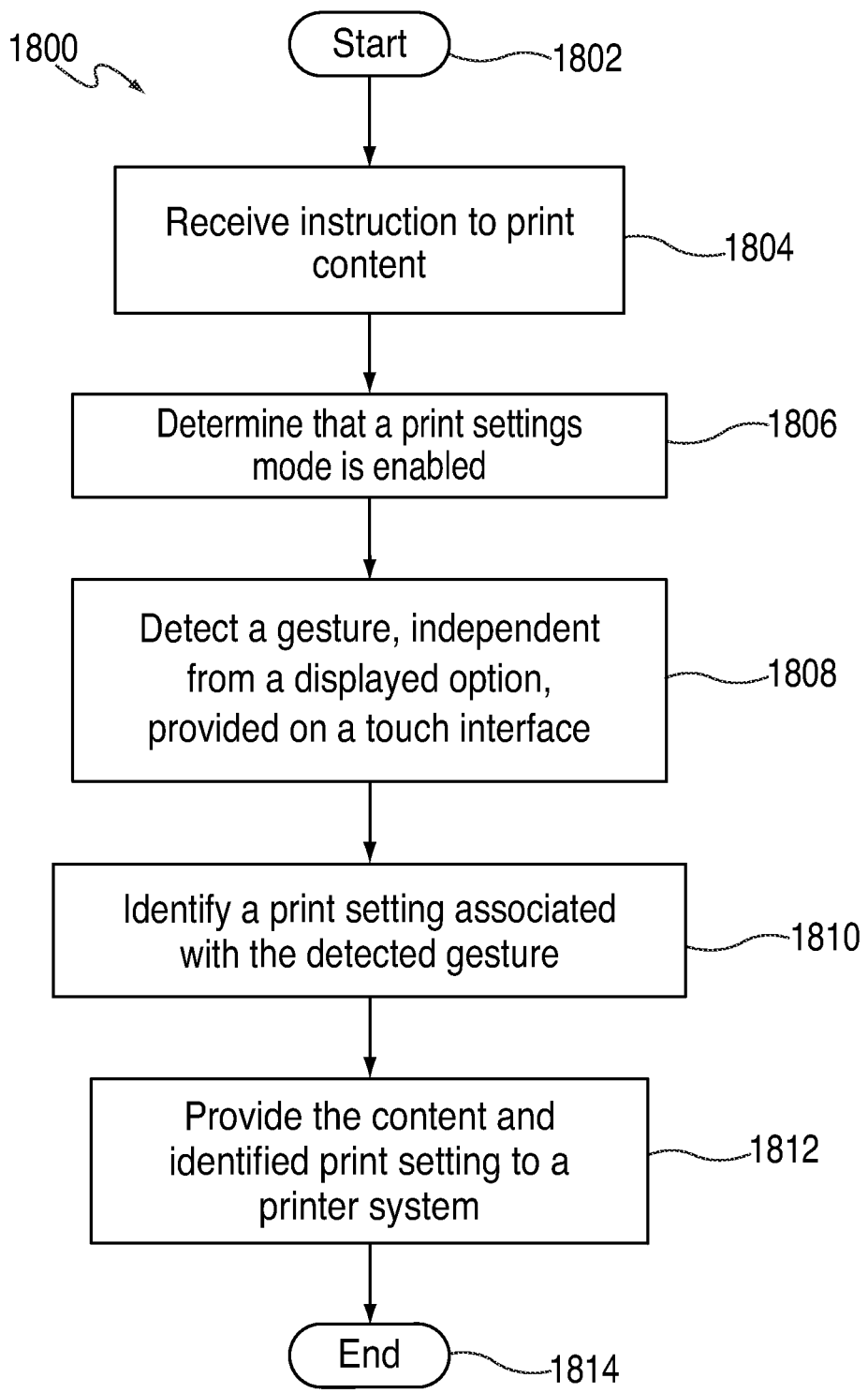
FIG. 18 is a flowchart of an illustrative process for defining a print setting in accordance with some embodiments of the invention.

The following flowcharts illustrate different processes implemented by a device to define print settings. FIG. 18 is a flowchart of an illustrative process for defining a print setting in accordance with some embodiments of the invention. Process 1800 can begin at step 1802. At step 1804, an instruction to print content can be received. For example, the electronic device can detect an instruction to print currently displayed content using a printer system to which the device is connected. At step 1806, the device can determine that a mode for selecting print settings is enabled. For example, the electronic device can detect a particular motion, or a particular input associated with a print setting mode. At step 1808, a gesture provided on a touch interface can be detected. The gesture can be, at least initially, independent of the content or options displayed on the device. In this manner, the touch gesture can be associated with a particular print setting, rather than a displayed option that a user must select. At step 1810, a print setting associated with a detected gesture can be identified. In some cases, the electronic device can identify a region of the display in which a gesture was detected, and determine a print setting associated with a gesture detected in the identified region. At step 1812, the content and identified print setting can be provided to a printer system. In some cases, several print settings can be identified and transmitted with the content. Process 1800 can then end at step 1814.

Figure 19:
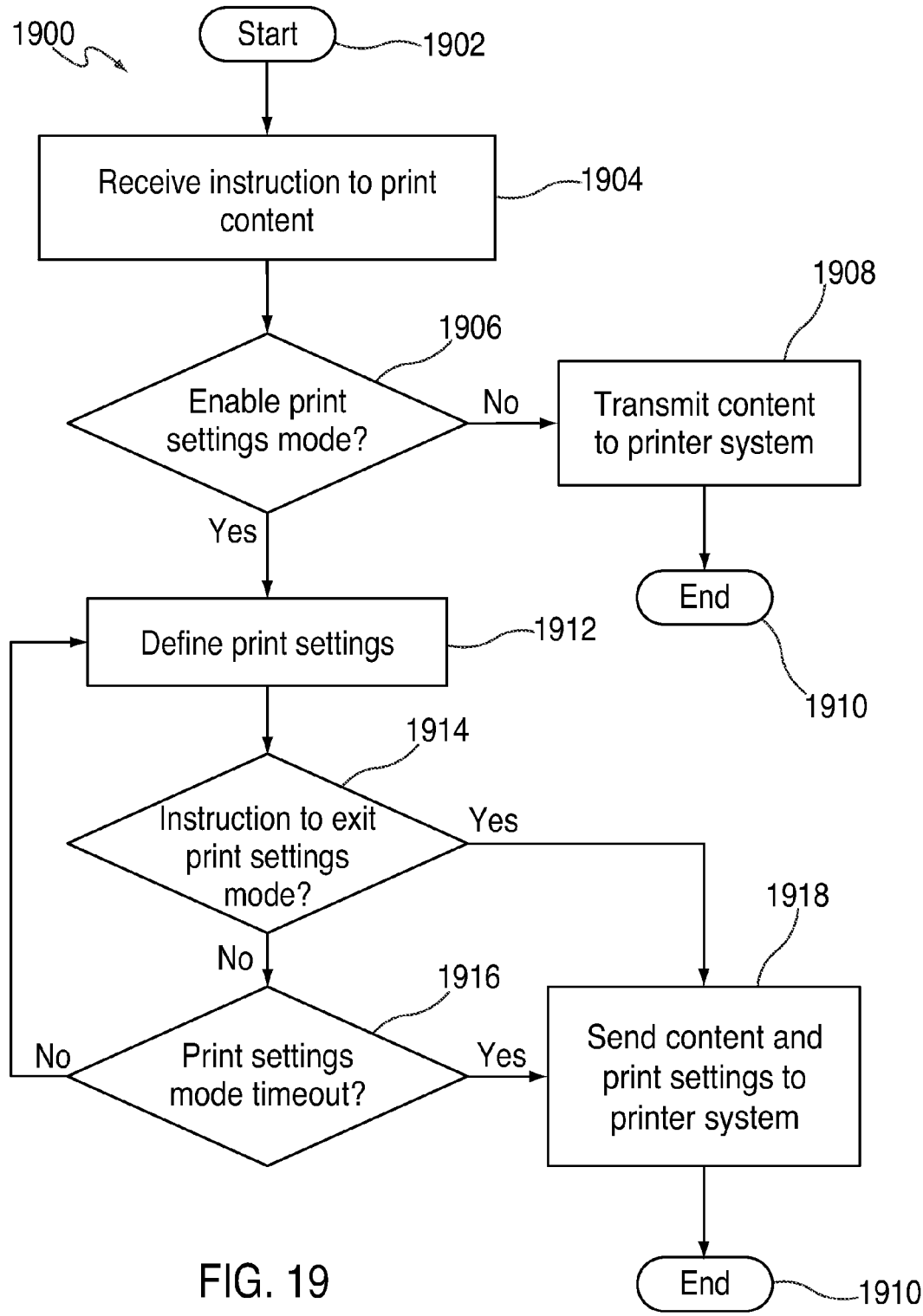
FIG. 19 is a flowchart of an illustrative process for enabling a print settings mode in accordance with some embodiments of the invention.

FIG. 19 is a flowchart of an illustrative process for enabling a print settings mode in accordance with some embodiments of the invention. Process 1900 can begin at step 1902. At step 1904, an instruction to print content can be received. For example, an electronic device can receive an input from an input interface directing the device to send displayed content to a printer system. At step 1906, the electronic device can determine whether a print settings mode is enabled. For example, the device can determine whether an input or motion corresponding to enabling the print settings mode was provided. If the electronic device determines that no such instruction was provided, process 1900 can move to step 1908 at which the content is transmitted, with default print settings, to the printer system. Process 1900 can then end at step 1910.

If, at step 1906, the electronic device instead determines that the print settings mode is enabled, process 1900 can move to step 1912. At step 1912, print settings can be defined. For example, the electronic device can detect particular inputs or particular motions that are associated with print settings. At step 1914, the electronic device can determine whether an instruction to exit the print settings mode was received. For example, the electronic device can determine whether a motion or input similar to the one used to enable the print settings mode was received. As another example, the electronic device can determine whether an option corresponding to an instruction to print with the defined settings was received. If no instruction was received, process 1900 can move to step 1916.

At step 1916, the electronic device can determine whether a timeout associated with the print settings mode has lapsed. For example, the electronic device can determine whether a timeout beginning from the time the print settings mode was enabled, from the time of the last defined print instruction, or both, has lapsed. If the device determines that the print settings mode has not timed out, process 1900 can return to step 1912. If the device instead determines that the print settings mode has timed out, process 1900 can move to step 1918. Similarly, if at step 1914 the electronic device instead determines that an instruction to exit the print settings mode was received, process 1900 can move to step 1918. At step 1918, the content to print, along with the defined print settings, can be sent to a printer system. Process 1900 can then end at step 1910.

Figure 20:
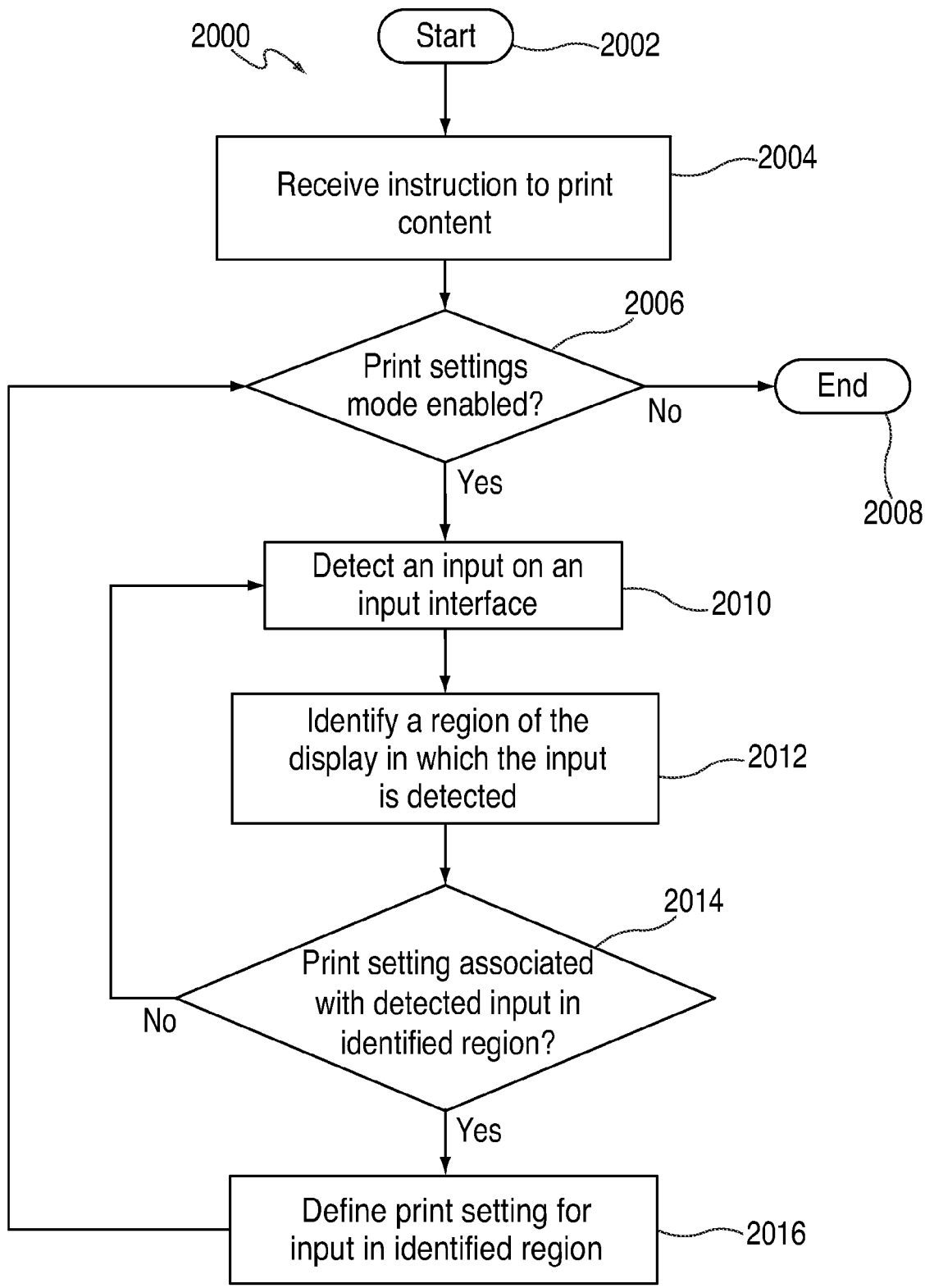
FIG. 20 is a flowchart of an illustrative process for identifying a print setting associated with a received input in accordance with some embodiments of the invention.

FIG. 20 is a flowchart of an illustrative process for identifying a print setting associated with a received input in accordance with some embodiments of the invention. Process 2000 can begin at step 2002. At step 2004, an instruction to print content can be received. For example, an instruction to provide displayed content to a printer system can be received. At step 2006, the electronic device can determine whether a print settings mode is enabled. For example, the electronic device can determine whether an instruction to enable a print settings mode was enabled. Alternatively, if the print settings mode was previously enabled, the electronic device can determine whether an instruction to exit the print settings mode was received. If the electronic device determines that the print settings mode is not enabled, process 2000 can move to step 2008 and end.

If, at step 2006, the electronic device instead determines that the print settings mode is enabled, process 2000 can move to step 2010. At step 2010, an input on an input interface can be detected. For example, an input provided using a touch interface can be detected. In some cases, the input can be independent of the content or selectable options provided on the device display. At step 2012, a region of the display in which the input was detected can be identified. For example, the electronic device can determine whether the input was detected in a region near an edge or a corner of the display boundary. As another example, the electronic device can determine whether the input extends between opposite edges of the display. At step 2014, the electronic device can determine whether a print setting is associated with the detected input in the identified region. For example, the electronic device can compare the detected input with a library of inputs that correspond to print settings. In some cases, to improve processing efficiency, the electronic device can first determine whether a print setting defined by an input in the identified region is associated with the detected input (e.g., limit the search in the library of inputs for inputs corresponding to the identified region). If the electronic device determines that no print setting is associated with the input, process 2000 can return to step 2010, described above.

If, at step 2014, the electronic device instead determines that a print setting is associated with the detected input in the identified region, process 2014 can move to step 2016. At step 2016, a print setting can be defined for the detected input in the identified region. For example, the electronic device can determine a particular value for a print setting based on the detected input. The defined print setting can be saved so that it may be transmitted to the printer system once all of the print settings have been defined. Process 2000 can then return to step 2006, described above.

Although many of the embodiments of the present invention are described herein with respect to personal computing devices, it should be understood that the present invention is not limited to personal computing applications, but is generally applicable to other applications.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above described embodiments of the invention are presented for purposes of illustration and not of limitation.

What is claimed is:

1. A method for defining print settings, comprising:
receiving an instruction to print content on a device;
determining that a mode for defining the print settings for the content is enabled;
detecting a recognized movement of the device in free space;
identifying a print setting associated with the detected recognized movement; and
providing the identified print setting to a printer system.

2. The method of claim 1, wherein:
the recognized movement comprises flipping the device over one of a short end of the device and a long end of the device; and
identifying a bound-edge printing option in response to detecting the recognized movement.

3. The method of claim 1, wherein:
the recognized movement comprises flipping the device over and subsequently shaking the device; and
undoing a previously set print setting in response to detecting the recognized movement.

4. The method of claim 1, further comprising:
displaying a representation of the identifed print setting on a display of the device.

5. The method of claim 1, further comprising:
receiving an output from a motion sensing component; and
determining that the received output corresponds to an instruction to enable the mode for defining the print settings.

6. The method of claim 5, wherein:
the received output corresponds to a motion provided when the device is shaken.

7. The method of claim 5, wherein the detecting comprises:
processing the output received from the motion sensing component; and
identifying the recognized movement of the device from the processed output.

8. The method of claim 7, further comprising:
comparing the identified movement of the device with a library of recognized device movements associated with the print settings.

9. The method of claim 5, wherein the detecting comprises:
comparing the received output with a library of recognized device movements each associated with a specific print setting.

10. An electronic device for printing content, comprising:
a display operative to display the content;
an input interface operative to receive an instruction to print the content;
a motion detection component operative to provide an output corresponding to the motion of the device;
control circuitry operative to:
detect an output from the motion detection component; and
define a print setting associated with the detected output; and
communications circuitry operative to provide the defined print setting to a printer system.

11. The electronic device of claim 10, wherein the control circuitry is further operative to:
determine that the output from the motion detection component corresponds to an instruction to enable a print settings mode; and
determine that a subsequent output from the motion detection component corresponds to an instruction to define the print setting.

12. The electronic device of claim 10, wherein the control circuitry is further operative to:
determine that the output from the motion detection component corresponds to a shaking motion of the device; and
enable a print settings mode in response to determining that the output corresponds to the shaking motion.

13. The electronic device of claim 10, wherein the control circuitry is further operative to:
determine that the output from the motion detection component corresponds to flipping the device over an edge of the device;
identify the edge over which the device is flipped; and
define a two-sided print setting bound along the identified edge.

14. The electronic device of claim 10, wherein the control circuitry is further operative to:
determine that the output from the motion detection component corresponds to flipping over and shaking the device; and
undo a previously defined print setting in response to determining that the output corresponds to the flipping over and the shaking the device.

15. A method for defining a print setting, comprising:
receiving an instruction to print a document;
detecting a first movement of a device associated with enabling a print settings mode;

enabling the print settings mode in response to detecting the first movement;

detecting a second movement of the device in free space associated with defining the print setting; and defining the print setting in response to detecting the second movement.

16. The method of claim 15, wherein:

the first movement and the second movement are different.

17. The method of claim 15, wherein the print setting comprises at least one of:

two-sided printing; and undoing a previously-defined print setting.

18. The method of claim 15, further comprising:

receiving an instruction to exit the print settings mode; and providing the content of the document and the defined print setting to a printer system.

19. The method of claim 15, wherein:

each of the first movement and the second movement are compared to a library of movements associated with print settings.

20. A non-transitory computer-readable medium for defining print settings, the non-transitory computer-readable medium comprising computer-readable instructions recorded thereon for:

receiving an instruction to print content on a device;

determining that a mode for defining the print settings for the content is enabled;

detecting a recognized movement of the device in free space;

identifying a print setting associated with the detected recognized movement; and providing the identified print setting to a printer system.

* * * * *